United States Patent
Numazawa et al.

(10) Patent No.: US 10,528,224 B2
(45) Date of Patent: Jan. 7, 2020

(54) SERVER, DISPLAY CONTROL METHOD, AND DISPLAY CONTROL PROGRAM

(71) Applicant: Rakuten, Inc., Tokyo (JP)

(72) Inventors: Jun Numazawa, Tokyo (JP); Tenshin Hayashi, Tokyo (JP)

(73) Assignee: Rakuten, Inc., Tokyo (JP)

( * ) Notice: Subject to any disclaimer, the term of this patent is extended or adjusted under 35 U.S.C. 154(b) by 525 days.

(21) Appl. No.: 15/034,294

(22) PCT Filed: Dec. 10, 2014

(86) PCT No.: PCT/JP2014/082736
§ 371 (c)(1),
(2) Date: May 4, 2016

(87) PCT Pub. No.: WO2016/092653
PCT Pub. Date: Jun. 16, 2016

(65) Prior Publication Data
US 2016/0349943 A1    Dec. 1, 2016

(51) Int. Cl.
*G06F 3/0482* (2013.01)
*G06F 9/451* (2018.01)
(Continued)

(52) U.S. Cl.
CPC .......... *G06F 3/0482* (2013.01); *G06F 3/0486* (2013.01); *G06F 9/453* (2018.02); *G06F 16/22* (2019.01)

(58) Field of Classification Search
CPC ...... G06F 3/0482; G06F 3/048; G06F 3/0486; G06F 9/4446; G06F 17/30312
See application file for complete search history.

(56) References Cited

U.S. PATENT DOCUMENTS 3,795,911 A * 3/1974 Hammack ............... G01S 1/302
342/106
4,630,219 A * 12/1986 DiGiacomo ........ G06F 17/5072
716/123
(Continued)

FOREIGN PATENT DOCUMENTS

JP    200897435 A    4/2008

OTHER PUBLICATIONS

International Preliminary Report on Patentability issued from the International Bureau in counterpart International Application No. PCT/JP2014/082736, dated Jun. 22, 2017.
(Continued)

*Primary Examiner* — Jung-Mu T Chuang
(74) *Attorney, Agent, or Firm* — Sughrue Mion, PLLC

(57) ABSTRACT

A server according to one embodiment includes a receiving unit, a position determination unit, and a transmitting unit. The receiving unit receives, from a terminal, selection information indicating at least one item selected on the terminal displaying a list containing a set of a plurality of items. The position determination unit determines a position to which the at least one item can be moved in the list by referring to a storage unit storing constraint information. The transmitting unit transmits, to the terminal, position information indicating a determination result by the position determination unit in order to display a position to which the at least one item can be moved and a position to which the at least one item cannot be moved in a distinguishable manner on the terminal at an arbitrary time before movement of the at least one item is completed.

8 Claims, 13 Drawing Sheets

(51) Int. Cl.
*G06F 16/22* (2019.01)
*G06F 3/0486* (2013.01)

(56) References Cited

U.S. PATENT DOCUMENTS

| | | | | |
|---|---|---|---|---|
| 5,425,139 | A * | 6/1995 | Williams | G06F 3/04845 345/474 |
| 5,617,510 | A * | 4/1997 | Keyrouz | G06F 17/5086 706/45 |
| 5,712,964 | A * | 1/1998 | Kamada | G06T 13/00 345/418 |
| 5,844,554 | A * | 12/1998 | Geller | G06F 8/34 715/744 |
| 5,845,302 | A * | 12/1998 | Cyman, Jr. | G06T 11/60 715/209 |
| 5,960,419 | A * | 9/1999 | Fagg, III | G09B 7/04 706/59 |
| 6,289,513 | B1 * | 9/2001 | Bentwich | G06F 8/30 706/45 |
| 6,300,948 | B1 * | 10/2001 | Geller | G06F 8/34 715/744 |
| 6,353,452 | B1 * | 3/2002 | Hamada | G06F 17/30392 707/999.004 |
| 6,507,349 | B1 * | 1/2003 | Balassanian | G06F 3/04812 345/440.1 |
| 6,834,282 | B1 * | 12/2004 | Bonneau | G06F 17/30961 |
| 6,928,618 | B2 * | 8/2005 | Kohls | G06T 17/10 345/642 |
| 7,174,514 | B2 * | 2/2007 | Subramaniam | G06F 3/0481 715/708 |
| 7,461,058 | B1 * | 12/2008 | Rauser | G06Q 30/02 |
| 7,581,197 | B2 * | 8/2009 | Arunachalam | G06F 17/5072 716/119 |
| 7,665,028 | B2 * | 2/2010 | Cummins | G06F 3/0486 715/769 |
| 8,108,241 | B2 * | 1/2012 | Shukoor | G06Q 10/06 705/7.27 |
| 8,127,240 | B2 * | 2/2012 | Grotjohn | G06F 3/0486 715/769 |
| 8,170,901 | B2 * | 5/2012 | Shukla | G06Q 10/06 705/7.12 |
| 8,255,818 | B2 * | 8/2012 | Bales | G06F 3/0486 345/440 |
| 8,276,152 | B2 * | 9/2012 | Sanghvi | G06F 8/71 715/771 |
| 8,345,043 | B2 * | 1/2013 | Kripac | G06F 17/5086 345/420 |
| 8,775,947 | B2 * | 7/2014 | Martinez | G06F 3/0486 715/748 |
| 8,799,186 | B2 * | 8/2014 | White | G06Q 30/0201 706/11 |
| 8,924,416 | B2 * | 12/2014 | Sedlar | G06F 16/83 707/769 |
| 9,069,829 | B2 * | 6/2015 | Kwiatkowski | G06F 17/3056 |
| 9,104,300 | B2 * | 8/2015 | Brownholtz | G06F 3/0486 |
| 9,354,800 | B2 * | 5/2016 | Cummins | G06F 3/0486 |
| 9,395,959 | B2 * | 7/2016 | Hatfield | G06Q 10/06 |
| 9,400,599 | B2 * | 7/2016 | Park | G06F 3/0486 |
| 9,582,488 | B2 | 2/2017 | Di Blas | |
| 9,634,918 | B2 * | 4/2017 | Lipstone | H04L 41/509 |
| 9,759,827 | B2 * | 9/2017 | Sallas | G01V 1/38 |
| 10,044,787 | B1 | 8/2018 | Frazier | H04L 67/02 |
| 2002/0085017 | A1 * | 7/2002 | Pisutha-Arnond | G06F 3/0482 345/660 |
| 2002/0097271 | A1 * | 7/2002 | Nagasawa | G06F 17/243 715/764 |
| 2003/0051165 | A1 * | 3/2003 | Krishnan | H04L 63/0227 726/4 |
| 2004/0034556 | A1 * | 2/2004 | Matheson | B61L 27/0016 705/7.24 |
| 2004/0119717 | A1 * | 6/2004 | Furumoto | G06T 13/00 345/473 |
| 2004/0174393 | A1 * | 9/2004 | Hough | G06F 3/0481 715/753 |
| 2004/0194029 | A1 * | 9/2004 | Altman | G06F 17/24 715/255 |
| 2006/0074730 | A1 * | 4/2006 | Shukla | G06Q 10/06 705/7.27 |
| 2007/0219816 | A1 * | 9/2007 | Van Luchene | G06Q 10/06 705/80 |
| 2007/0255667 | A1 * | 11/2007 | Emek | G06N 5/045 706/19 |
| 2008/0033777 | A1 * | 2/2008 | Shukoor | G06Q 10/06 705/7.11 |
| 2009/0282332 | A1 * | 11/2009 | Porat | G06F 3/0482 715/702 |
| 2010/0017734 | A1 * | 1/2010 | Cummins | G06F 3/0486 715/769 |
| 2010/0257470 | A1 * | 10/2010 | Ari | G06Q 10/06 715/764 |
| 2010/0279260 | A1 * | 11/2010 | White | G09B 7/02 434/236 |
| 2011/0161110 | A1 * | 6/2011 | Mault | G06Q 30/02 705/3 |
| 2012/0030566 | A1 * | 2/2012 | Victor | G06F 3/0482 715/702 |
| 2012/0078677 | A1 * | 3/2012 | Green | G06Q 10/06 705/7.26 |
| 2012/0131518 | A1 * | 5/2012 | Lee | G06F 3/011 715/863 |
| 2012/0162265 | A1 * | 6/2012 | Heinrich | G06Q 10/06393 345/661 |
| 2012/0191747 | A1 * | 7/2012 | Kwiatkowski | G06F 17/3056 707/769 |
| 2012/0203589 | A1 * | 8/2012 | Eggena | G06Q 10/06 705/7.15 |
| 2013/0024227 | A1 * | 1/2013 | Iwane | G06Q 10/047 705/7.13 |
| 2013/0152021 | A1 * | 6/2013 | Hatfield | G06Q 10/0633 715/843 |
| 2013/0152041 | A1 * | 6/2013 | Hatfield | G06F 8/34 717/105 |
| 2013/0174070 | A1 * | 7/2013 | Briand | G06F 3/04817 715/769 |
| 2014/0047369 | A1 * | 2/2014 | Schiller | G06F 3/0486 715/769 |
| 2014/0240754 | A1 * | 8/2014 | Smyth | G06F 3/1204 358/1.15 |
| 2014/0258886 | A1 * | 9/2014 | Strong | H04M 1/72522 715/753 |
| 2015/0177952 | A1 * | 6/2015 | Meyer | G06F 3/04842 715/739 |
| 2015/0193108 | A1 * | 7/2015 | Li | G06F 3/0486 715/748 |
| 2015/0254691 | A1 * | 9/2015 | Chandler | G06F 3/0482 705/7.32 |
| 2017/0024101 | A1 * | 1/2017 | Kohashi | G06F 3/0488 |
| 2017/0053057 | A1 * | 2/2017 | Riviere-Cazaux | G03F 7/70433 |
| 2017/0132570 | A1 * | 5/2017 | Seetoh | G06F 16/24578 |
| 2017/0344631 | A1 * | 11/2017 | Thirumalai-Anandanpillai | G06F 17/30684 |
| 2018/0375918 | A1 * | 12/2018 | Frazier | H04L 67/06 |

OTHER PUBLICATIONS

The jQuery Foundation, "jQuery user interface, Sortable", Aug. 22, 2005, [online] http://jqueryui.com/sortable/ [retrieved May 13, 2016], p. 1-3.

* cited by examiner

Fig.4

| LIST ID | ITEM ID | CONTENT | ORDER | UPDATE DATE AND TIME |
|---|---|---|---|---|
| 01 | 0101 | QUESTION A1 | 1 | 2014/11/15 11:30:00 |
| | 0102 | QUESTION A2 | 2 | |
| | 0103 | QUESTION A3 | 3 | |
| | 0104 | QUESTION A4 | 4 | |
| | 0105 | QUESTION A5 | 5 | |
| | 0106 | QUESTION A6 | 6 | |
| | 0107 | QUESTION A7 | 7 | |
| | 0108 | QUESTION A8 | 8 | |
| 02 | 0201 | QUESTION B1 | 1 | 2014/11/20 10:40:00 |
| | 0202 | QUESTION B2 | 2 | |
| | 0203 | QUESTION B3 | 3 | |
| | 0204 | QUESTION B4 | 4 | |
| | 0205 | QUESTION B5 | 5 | |
| ... | ... | ... | ... | ... |

Fig.5

| LIST ID | CONSTRAINTS |
|---------|-------------|
| 01 | • "Question A3 should be after Question A2"<br>• "Question A7 should be after Question A1 and Question A2"<br>• "Question A4 should be after Question A3"<br>• "Questions A4, A5 and A6 are in one group" |
| 02 | • "Question B3 should be after Question B1"<br>• "Question B4 should be after Question B3" |
| ... | ... |

32

SERVER, DISPLAY CONTROL METHOD, AND DISPLAY CONTROL PROGRAM

CROSS REFERENCE TO RELATED APPLICATIONS

This application is a National Stage of International Application No. PCT/JP2014/082736, filed Dec. 10, 2014, the contents of which are incorporated herein by reference in its entirety.

TECHNICAL FIELD

One aspect of the present invention relates to a server, a method and a program for controlling the order of items in a list.

BACKGROUND ART

Techniques for changing the order of items in a list that includes a plurality of items have been known. For example, a sample of a user interface called "Sortable" is disclosed in Non Patent Literature 1 below. In this sample, the order of seven items (Item 1 to Item 7) can be freely changed by drag and drop.

CITATION LIST

Non Patent Literature

NPL1: The jQuery Foundation, "jQuery user interface, Sortable", [online], Internet <URL:http://jqueryui.com/sortable/>

SUMMARY OF INVENTION

Technical Problem

In the case where there are constraints on the order of items in a list, it is not possible to freely change the order of the items as a matter of course. Thus, when fixing the change, it is necessary to determine whether the order after change satisfies the constraints or not, and fix the change only when the constraints are satisfied. However, in such a process, whether the order after change satisfies the constraints is unknown until just before when fixing the change, and if the change does not satisfy the constraints, a user who is an operator needs to reattempt the operation of changing the order from the beginning. The convenience of a user is improved if it is possible to show the user the constraints on the order when the user intends to change the order of items in a list.

Solution to Problem

A server according to one aspect of the present invention includes a receiving unit configured to receive, from the terminal, selection information indicating at least one item selected on a terminal displaying a list containing a set of a plurality of items; a position determination unit configured to determine a position to which the at least one item can be moved in the list by referring to a storage unit storing constraint information indicating constraints on an order of the plurality of items; and a transmitting unit configured to transmit, to the terminal, position information indicating a determination result by the position determination unit in order to display a position to which the at least one item can be moved and a position to which the at least one item cannot be moved in a distinguishable manner on the terminal at an arbitrary time before movement of the at least one item is completed.

A display control method according to one aspect of the present invention is a display control method performed by a server including a processor, the method including a receiving step of receiving, from the terminal, selection information indicating at least one item selected on a terminal displaying a list containing a set of a plurality of items; a position determination step of determining a position to which the at least one item can be moved in the list by referring to a storage unit storing constraint information indicating constraints on an order of the plurality of items; and a transmitting step of transmitting, to the terminal, position information indicating a determination result in the position determination step in order to display a position to which the at least one item can be moved and a position to which the at least one item cannot be moved in a distinguishable manner on the terminal at an arbitrary time before movement of the at least one item is completed.

A display control program according to one aspect of the present invention causes a computer to function as a detection unit configured to detect that at least one item is selected on a terminal displaying a list containing a set of a plurality of items and transmit selection information indicating the at least one item to a server; and a display control unit configured to receive position information transmitted from the server in response to the selection information and, based on the position information display a position to which the at least one item can be moved and a position to which the at least one item cannot be moved in the list in a distinguishable manner at an arbitrary time before movement of the at least one item is completed, and the server determines a position to which the at least one item can be moved in the list by referring to a storage unit storing constraint information indicating constraints on an order of the plurality of items, and the position information indicates a result of the determination.

According to the above aspects, when at least one item is selected in a list displayed on a terminal, a position to which the selected item can be moved is determined based on constraints on the order of items, and position information indicating the determination result is transmitted to the terminal. Then, based on the position information, a position to which the selected item can be moved and a position to which it cannot be moved are displayed in a distinguishable manner on the terminal. It is thus possible to show a user the constraints on the order (position to which the item can be moved) when the user intends to change the order of items in the list.

Advantageous Effects of Invention

According to one aspect of the present invention, it is possible to show a user the constraints on the order when the user intends to change the order of items.

BRIEF DESCRIPTION OF DRAWINGS

FIG. 4 is a view showing an example of a list database.

FIG. 5 is a view showing an example of a constraint database.

DESCRIPTION OF EMBODIMENTS

An embodiment of the present invention is described hereinafter in detail with reference to the appended drawings. Note that, in the description of the drawings, the same or equivalent elements are denoted by the same reference symbols, and the redundant explanation thereof is omitted.

(First Embodiment)

In this embodiment, a server according to the present invention is applied to a list management system 1. The functions and configuration of the list management system 1 according to the first embodiment are described with reference to FIGS. 1 to 6. The list management system 1 is a computer system that supports a user to change the order of items in a list. In this embodiment, a user can change the order of a plurality of items contained in a list that is displayed on a terminal. Note that, however, because the constraints on the order of items is preset to the list, the user cannot freely change the order of items, and the order of items can be changed only when the constraints are satisfied. In order to enhance the convenience of changing the order, when a user is about to perform the operation of changing the order of a certain item, the list management system 1 shows a user in real time where the item can be moved.

"User" is a person who sets the order of items by using a terminal. The user may or may not be an owner of the terminal.

"List" is information or data containing a set of a plurality of items. "Item" is each element in the list. An initial value of the order is present to each item in the list, and the plurality of items are arranged in a line according to that order in the list. A user can change the order. "Order" is a numerical value indicating the sequence of items in the list. The meaning of the order is not particularly limited, and it may be the order of display, the order of receiving input or the like, for example.

"Change the order" is the processing of rearranging items in the list. A method for the operation of changing the order is not limited. For example, the order may be changed by drag and drop, which is the operation of selecting an item whose order is to be changed and moving the item to a position to which the item is to be moved, and then deselecting the item at that position. Alternatively, the order may be changed by the operation of selecting an item whose order is to be changed and then selecting a position to which the item is to be moved. A position to which an item can be moved is any one of a position before the first item in the list, a position between an item and an item in the list, or a position after the last item in the list. Because the plurality of items are arranged in a line in the list, a position to which an item can be moved is set along one virtual axis from the first to the last in the list.

Figure 1:
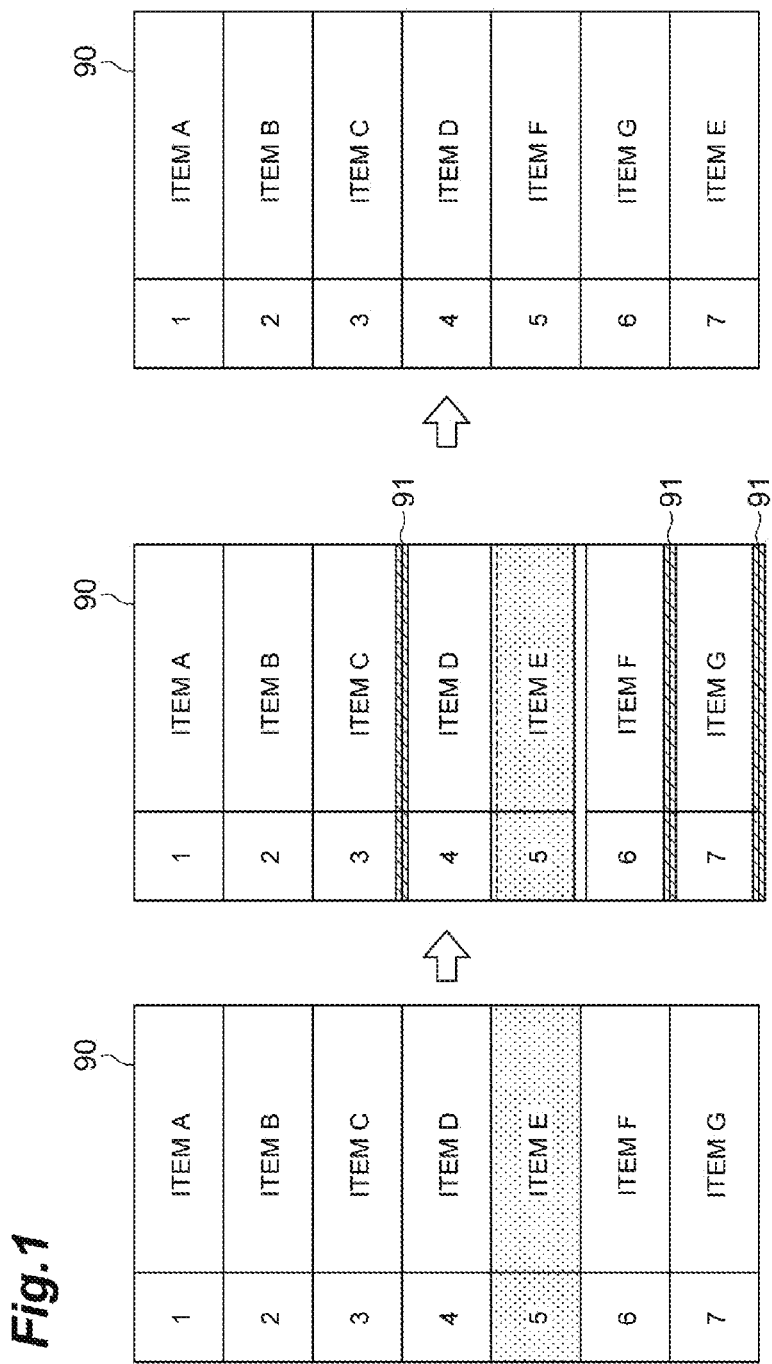
FIG. 1 is a view showing an example of display control according to an embodiment.

FIG. 1 shows one example of the support of an operation. This example shows that, when an item E is selected from a list 90 containing seven items A to G and the item starts to be dragged, positions to which the item E can be moved are displayed with heavy lines 91 in a specified color (see the middle part of FIG. 1). By this display, a user can find that the item E can be moved to the position between the item C and the item D, the position between the item F and the item G, or the position just after the item G. Specifically, the user can find that the order of the item E can be changed from the fifth position to the fourth, sixth or seventh position. Stated differently, the user can find that the order of the item E cannot be changed to the first, second and third positions. FIG. 1 shows that the user has dragged the item E to the position just after the item G by the guide of the heavy line 91 and deselects (drop) the item at that position, and thereby the item E is moved to the seventh position (see the right part of FIG. 1).

Figure 2:
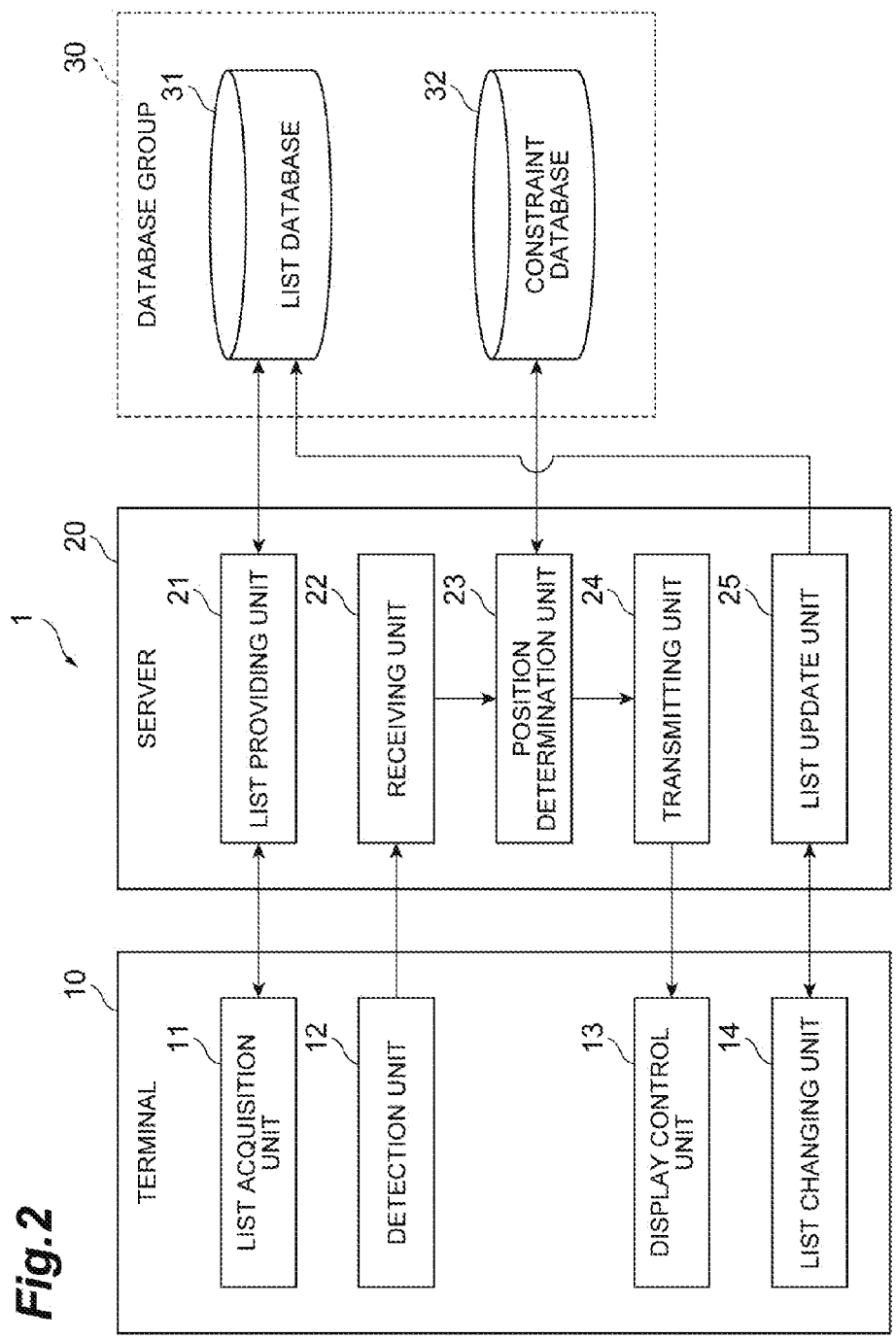
FIG. 2 is a block diagram showing a functional configuration of a list management system according to a first embodiment.

As shown in FIG. 2, the list management system 1 includes a terminal 10, a server 20, and a database group 30. The terminal 10 and the server 20 are connected through a communication network such as the Internet or an intranet. The server 20 connects and communicates with the database group 30.

The terminal 10 is a computer operated by a user. The type of the terminal 10 is not particularly limited, and the terminal 10 may be a stationary or portable personal computer (PC), or a mobile terminal such as an advanced mobile phone (smart phone), a cellular phone or a personal digital assistant (PDA), for example. Note that, although only one terminal 10 is shown in FIG. 2, a plurality of terminals 10 may be included in the list management system 1.

The server 20 is a computer that provides the terminal 10 with information indicating a position to which an item can be moved. The server 20 generally has higher throughput capacity than the terminal 10 and is composed of a plurality of computers in some cases, though the capacity and the configuration of the server 20 are not limited thereto.

The database group 30 is a set of databases (storage devices) that store data necessary for processing in the list management system 1.

Figure 3:
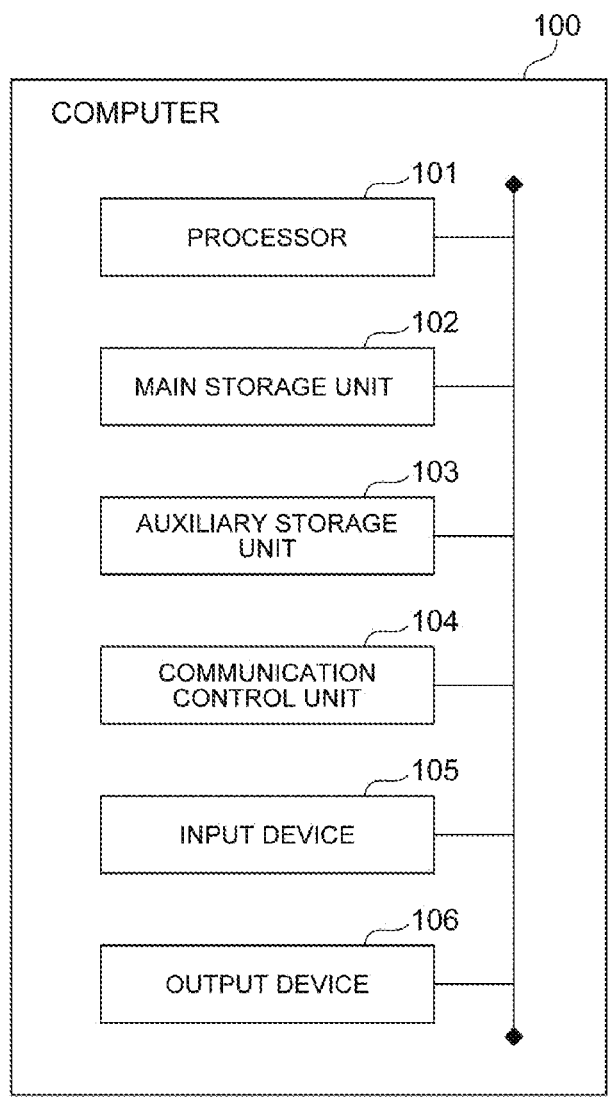
FIG. 3 is a view showing a hardware configuration of a computer to implement a list management system according to an embodiment.

FIG. 3 shows a typical hardware configuration of a computer 100 that functions as the terminal 10 and the server 20. The computer 100 includes a processor (for example, CPU) 101 that executes an operating system, an application program and the like, a main storage unit 102 such as ROM and RAM, an auxiliary storage unit 103 such as a hard disk or a flash memory, a communication control unit 104 such as a network card or a wireless communication module, an input device 105 such as a keyboard, a mouse or a touch panel, and an output device 106 such as a monitor or a touch panel. As a matter of course, hardware modules mounted thereon vary by the type of the computer 100. For example, while a stationary PC often includes a keyboard, a mouse and a monitor as the input device and the output device, a smartphone often has a touch panel that functions as the input device and the output device.

The functional elements of the list management system 1, which are described later, are implemented by loading given software onto the processor 101 or the main storage unit 102, making the communication control unit 104, the input device 105, the output device 106 and the like operate under control of the processor 101, and performing reading and writing of data in the main storage unit 102 or the auxiliary storage unit 103. The data and databases required for processing are stored in the main storage unit 102 or the auxiliary storage unit 103.

Prior to describing the functional elements of the terminal 10 and the server 20, the database group 30 that is referred to in the list management system 1 is described. As shown in FIG. 2, the database group 30 includes a list database 31 and a constraint database 32.

The list database 31 is a database that stores list data. The list data is data indicating a list for which a user operation is to be performed. The list data for at least one list is prestored in the list database 31 by an administrator of the list management system 1.

FIG. 4 shows an example of the list data. In this embodiment, items in the list data include list ID, item ID, content, order, and update date and time. The list ID is an identifier of a list. The item ID is an identifier of an item. The content of an item is information from which a user can recognize certain meaning. The order of an item means the order in the list. Although the meaning indicated by the list and the item is not particularly limited, one list corresponds to one questionnaire, and each item in the list corresponds to a question included in that questionnaire in this embodiment. The update date and time is the date and time when the list data has been updated last time. FIG. 4 shows that the list (questionnaire) identified by the list ID "01" is made up of eight items (eight questions A1 to A8) identified by the item ID "0101" to "0108" and updated at 11:30 AM on Nov. 15, 2014. It also shows that those eight questions are arranged in the order of: question A1, question A2, question A3, question A4, question A5, question A6, question A7 and question A8, from the top.

The constraint database 32 is a database that stores constraint information. The constraint information is information indicating the constraints on the order of a plurality of items in a list. "Constraints on the order" are conditions for changing the order of each item in a list, which define positions to which each item can be moved or cannot be moved when rearranging the items in the list. The items of the constraint information include a list ID and constraints on the order, and one or more constraints are associated with one list ID. The constraint information is prestored in the constraint database 32 by an administrator of the list management system 1.

FIG. 5 shows an example of the constraint information. FIG. 5 shows that the list identified by the list ID "01" has four constraints and the list identified by the list ID "02" has two constraints. "Questions A4, A5 and A6 are in one group", which is one of the constraints for the list ID "01", is group constraints indicating that those questions A4, A5 and A6 should be arranged in series. However, the order of questions in a group (for example, a group made up of the questions A4, A5 and A6) is arbitrary as long as there are no additional constraints on this group. Note that, the content of constraints is not limited to the example of FIG. 5, and the constraints such as "Question X should be before Question Y" and "Question Z can move to any position" may be set, for example.

Hereinafter, the functional configuration of the terminal 10 is described hereinafter. As shown in FIG. 2, the terminal 10 includes, as functional elements, a list acquisition unit 11, a detection unit 12, a display control unit 13 and a list changing unit 14. Those functional elements are implemented as a result that the processor 101 of the terminal 10 executes an installed or downloaded client program (display control program) P1.

The list acquisition unit 11 is a functional element that acquires list data for which a user operation is to be performed from the server 20. The list acquisition unit 11 is implemented as a result that the processor 101 executes the client program P1 and controls the main storage unit 102, the communication control unit 104 and the output device 106, for example.

When a user performs an operation for displaying a screen (for example, web page) containing a list on the terminal 10, the list acquisition unit 11 generates a list request for acquiring list data and transmits the list request to the server 20, and then receives the list data transmitted from the server 20 in response to the request. Then, the list acquisition unit 11 displays the list data on the terminal 10. The user can thereby view the list where items are arranged according to a specified order. On the basis of the example shown in FIG. 4, the list acquisition unit 11 generates and transmits a list request containing the list ID "01" and thereby acquires the list data containing the questions A1 to A8, and then displays the list where the questions A1 to A8 are arranged according to the specified order.

The detection unit 12 is a functional element that, when at least one item in a list displayed on the terminal 10 is selected as an item to be moved (which is an item whose order is to be changed), specifies the at least one item. The detection unit 12 is implemented as a result that the processor 101 executes the client program P1 and controls the main storage unit 102 and the input device 105, for example. In this specification, the item that is selected as an item to be moved is referred to as "selected item".

The detection unit 12 specifies the selected item by acquiring the item ID of the item selected as an item to be moved. The timing when the detection unit 12 specifies (detects) the selected item is not limited. For example, the detection unit 12 may specify (detect) the selected item at the time when a user starts a drag (not at the time when a user selects the item but the time when the user starts moving the item). Alternatively, the detection unit 12 may specify (detect) the selected item at the time when a user selects the item or may specify (detect) the selected item at the time when a user chooses the menu "move" after the selection.

After the detection unit 12 acquires the item ID of at least one selected item, it generates selection information containing a set of the item IDs and a list ID and transmits the selection information to the server 20. The selection information is information indicating at least one item selected on the terminal 10 displaying the list.

The display control unit 13 is a functional element that displays a position to which the selected item can be moved on the terminal 10 at an arbitrary time before the movement of the selected item is completed. The display control unit 13 is implemented as a result that the processor 101 executes the client program P1 and controls the main storage unit 102, the communication control unit 104 and the output device 106, for example.

Figure 6:
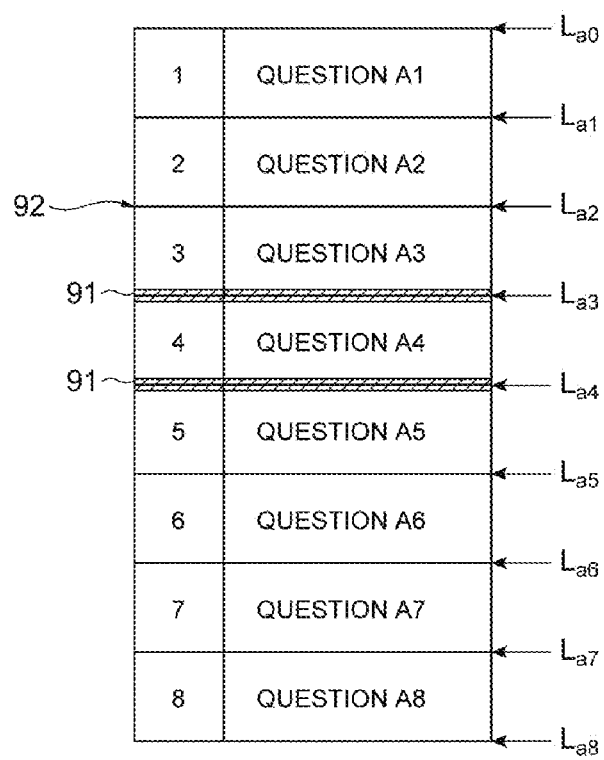
FIG. 6 is a view illustrating the way of displaying a position to which a selected item can be moved and a position to which it cannot be moved.

The display control unit 13 receives position information that is transmitted from the server 20 in response to the selection information transmitted by the detection unit 12. The position information is information indicating a determination result about a position to which the selected item can be moved, and the terminal 10 can thereby specify a position to which the item can be moved and a position to which the item cannot be moved. The position information may indicate the position to which the selected item can be moved, the position to which the selected item cannot be moved, or both of those two types of positions. In this embodiment, it is assumed that the position information indicates the position to which the selected item can be moved. The position to which the selected item can be moved is set to any of a position before the first item, a position between an item and an item, or a position after the last item. For example, when the list 92 (questions A1 to A8) corresponding to the list ID "01" is displayed on the terminal 10 as shown in FIG. 6, the position to which the selected item can be moved can be any of the positions $L_{a0}$, $L_{a1}$, . . . , $L_{a8}$.

The display control unit 13 displays the position to which the selected item can be moved (available position to be moved) and the position to which the selected item cannot be moved (unavailable position to be moved) in a distinguishable manner at an arbitrary time before the movement of the selected item is completed.

"Display in a distinguishable manner" means to differentiate the way of displaying the position to which the selected item can be moved and the way of displaying the position to which the selected item cannot be moved. Alternatively, "display in a distinguishable manner" means to display each position in such a way that a user can recognize the position to which the selected item can be moved and the position to which the selected item cannot be moved.

"Before the movement of the selected item is completed" means the range of time before the position to which the selected item is to be moved is specified by a user operation. For example, in the case where a user moves at least one item by drag and drop, the range of time before the drop operation is performed is the time "before the movement of the selected item is completed".

"Arbitrary time" means that the range of time when the position to which the selected item can be moved and the position to which the selected item cannot be moved are displayed in a distinguishable manner can be anytime before the movement of the selected item is completed. For example, the display control unit 13 may display the position to which the selected item can be moved and the position to which it cannot be moved in a distinguishable manner throughout the range of time before the movement of the selected item is completed. Alternatively, the display control unit 13 may display the position to which the selected item can be moved and the position to which it cannot be moved in a distinguishable manner only during a part of the range of time before the movement of the selected item is completed. Alternatively, when a user deselects the selected item without moving that item, the display control unit 13 may display the position to which the selected item can be moved and the position to which it cannot be moved in a distinguishable manner at an arbitrary time before the deselection. "Arbitrary time before deselection" is included in the concept "arbitrary time before the movement of the selected item is completed".

In this embodiment, the display control unit 13 displays the position indicated by the position information (position to which the selected item can be moved) with a heavy line in a specified color and maintain the position not indicated by the position information (position to which the selected item cannot be moved) in the initial state, thereby displaying those two types of positions so that they are distinguishable from each other. In the example of FIG. 6, positions $L_{a3}$ and $L_{a4}$ to which the selected item can be moved are shown with the heavy lines 91, and positions $L_{a0}$ to $L_{a2}$ and $L_{a5}$ and $L_{a8}$ to which the selected item cannot be moved are shown with section lines, which is in the initial state. In the case where the list 92 is in the state of FIG. 6, when a user moves the selected item to any of the positions $L_{a3}$ and $L_{a4}$, the selected item moves to that position, and the display positions of the other items change according to that movement. On the other hand, when a user moves the selected item to any of the positions $L_{a0}$ to $L_{a2}$ and $L_{a5}$ and $L_{a8}$, the list returns to the state before the item is selected as the item to be moved, without the movement.

Note that the way of displaying the position to which the selected item can be moved and the position to which the selected item cannot be moved is not limited. For example, the display control unit 13 may display the position to which the selected item cannot be moved with a heavy line and maintain the position to which the selected item can be moved in the initial state. Alternatively, the display control unit 13 may differentiate the way of displaying the two types of positions by using letters or symbols.

The list changing unit 14 is a functional element that transmits information of the list where the items have been rearranged by a user operation as change information to the server 20. The server 20 updates the list data in response to the transmission, and thereby the rearrangement of the items is fixed. The list changing unit 14 is implemented as a result that the processor 101 executes the client program P1 and controls the main storage unit 102 and communication control unit 104, for example.

The change information is information indicating the order of items in a list after change. For example, it is assumed that the changed sequence in the list with the list ID "01" is question A2, question A1, question A3, question A4, question A5, question A6, question A8 and question A7, from the top. In this case, the change information indicates that the order of question A1, question A2, question A3, question A4, question A5, question A6, question A7 and question A8 is 2, 1, 3, 4, 5, 6, 8 and 7, respectively.

Although the timing when the list changing unit 14 transmits the change information is not limited, the list changing unit 14 may transmit the change information each time one operation is completed, for example. "One operation" means that at least one item is selected as the item to be moved, and then the position to which the selected item is to be moved (in the example of FIG. 6, any one of the positions $L_{a3}$ and $L_{a4}$) is specified (that is, the selected item moves to the position to be moved). In the case of transmitting the change information each time one operation is completed, the list changing unit 14 receives a notification of completion transmitted from the server 20 in response to the change information and thereby recognizes that the order after change is registered in the list database 31, and continues to display the list after change. The notification of completion is data indicating that the change of the order made according to a user operation is fixed.

The functional configuration of the server 20 is described hereinafter. As shown in FIG. 2, the server 20 includes, as functional elements, a list providing unit 21, a receiving unit 22, a position determination unit 23, a transmitting unit 24, and a list update unit 25. Those functional elements are implemented as a result that the processor 101 of the server 20 executes a pre-installed server program P2.

The list providing unit 21 is a functional element that provides list data to the terminal 10. The list providing unit 21 is implemented as a result that the processor 101 executes the server program P2 and controls the main storage unit 102 and the communication control unit 104, for example.

When the list providing unit 21 receives a list request from the terminal 10, it reads list data corresponding to the list ID contained in the request from the list database 31, and transmits the list data to the terminal 10. On the basis of the example shown in FIG. 4, when the list providing unit 21 receives a list request containing the list ID "01", it acquires list data containing the questions A1 to A8 and transmits the list data to the terminal 10.

The receiving unit 22 is a functional element that receives selection information from the terminal 10. The receiving unit 22 is implemented as a result that the processor 101 executes the server program P2 and controls the main storage unit 102 and the communication control unit 104, for example. The receiving unit 22 outputs the selection information to the position determination unit 23.

The position determination unit 23 is a functional element that determines the position to which the selected item indicated by the selection information can be moved by referring to the constraint database 32. The position determination unit 23 is implemented as a result that the processor 101 executes the server program P2 and controls the main storage unit 102 and the communication control unit 104, for example.

The position determination unit 23 accesses the constraint database 32 and refers to the constraint information corresponding to the list ID contained in the selection information. Further, the position determination unit 23 accesses the list database 31 and refers to the current order of items in the list corresponding to the list ID. Then, based on those information, the position determination unit 23 determines the position to which the selected item can be moved for each item ID contained in the selection information. The position determination unit 23 then generates position information indicating the determination result (which is the position to which the selected item can be moved in this embodiment) and outputs the position information to the transmitting unit 24. In the case where the selection information contains only one item ID, the position determination unit 23 generates the position information indicating the position to which the selected item can be moved that corresponds to the item ID. In the case where the selection information contains at least two item IDs, the position determination unit 23 generates the position information indicating the position to which the selected item can be moved that is common to all of the item IDs. If there is no position to which the selected item can be moved, the position determination unit 23 sets null as the position information. Note that, because the order of items does not change when the selected item is moved to the position corresponding to the boundary of that item, the position determination unit 23 does not determine such a position as the position to which the selected item can be moved. The position determination unit 23 outputs the generated position information to the transmitting unit 24.

An example of the position information for the list ID "01" is described hereinafter on the basis of the example of FIGS. 4 and 5 and the sequence of questions and the positions $L_{a0}$ to $L_{a8}$ shown in FIG. 6.

In the case where the item ID contained in the selection information is only "0101", the constraints on the movement of the question A1 are "Question A7 should be after Question A1 and Question A2" and "Questions A4, A5 and A6 are in one group". Thus, the question A1 should be before the question A7 and cannot be placed in a position between the questions A4 to A6. Therefore, the position determination unit 23 determines that the positions $L_{a2}$, $L_{a3}$ and $L_{a6}$ are the position to which the selected item can be moved. Because the positions $L_{a0}$ and $L_{a1}$ correspond to the boundary of the question A1, the position determination unit 23 does not determine those two positions as the position to which the selected item can be moved (since this determination is a matter of course, the description about the position corresponding to the boundary of the selected item is omitted below).

In the case where the item ID contained in the selection information is only "0102", the constraints on the movement of the question A2 are "Question A3 should be after Question A2", "Question A7 should be after Question A1 and Question A2", and "Questions A4, A5 and A6 are in one group". Thus, the question A2 should be before the question A3, before the question A7, and cannot be placed in a position between the questions A4 to A6. Therefore, the position determination unit 23 determines that only the position $L_{a0}$ is the position to which the selected item can be moved.

In the case where the item ID contained in the selection information is only "0103", the constraints on the movement of the question A3 are "Question A3 should be after Question A2", "Question A4 should be after Question A3" and "Questions A4, A5 and A6 are in one group". Thus, the question A3 should be after the question A2, before the question A4, and cannot be placed in a position between the questions A4 to A6. Therefore, the position determination unit 23 determines that the position to which the selected item can be moved does not exist.

In the case where the item ID contained in the selection information is only "0104", the constraints on the movement of the question A4 are "Question A4 should be after Question A3" and "Questions A4, A5 and A6 are in one group". Thus, the question A4 should be after the question A3 and should be arranged in series with the questions A5 and A6 after the movement as well. Therefore, the position determination unit 23 determines that the positions $L_{a5}$ and $L_{a6}$ are the position to which the selected item can be moved.

In the case where the item ID contained in the selection information is only "0105", the constraint on the movement of the question A5 is "Questions A4, A5 and A6 are in one group". Thus, the question A5 should be arranged in series with the questions A4 and A6 after the movement as well. Therefore, the position determination unit 23 determines that the positions $L_{a3}$ and $L_{a6}$ are the position to which the selected item can be moved.

In the case where the item ID contained in the selection information is only "0106", the constraint on the movement of the question A6 is "Questions A4, A5 and A6 are in one group". Thus, the question A6 should be arranged in series with the questions A4 and A5 after the movement as well. Therefore, the position determination unit 23 determines that the positions $L_{a3}$ and $L_{a4}$ are the position to which the selected item can be moved. Note that, in this case, the list is displayed as shown in FIG. 6 on the terminal 10.

In the case where the item ID contained in the selection information is only "0107", the constraints on the movement of the question A7 are "Question A7 should be after Question A1 and Question A2" and "Questions A4, A5 and A6 are in one group". Thus, the question A7 should be after the question A1 and the question A2 and cannot be placed in a position between the questions A4 to A6. Therefore, the position determination unit 23 determines that the positions $L_{a2}$, $L_{a3}$ and $L_{a8}$ are the position to which the selected item can be moved.

In the case where the item ID contained in the selection information is only "0108", the constraint on the movement of the question A8 is "Questions A4, A5 and A6 are in one group". Thus, the question A8 cannot be placed in a position between the questions A4 to A6. Therefore, the position determination unit 23 determines that the positions $L_{a0}$ to $L_{a3}$ and $L_{a6}$ are the position to which the selected item can be moved.

In the case where the item ID contained in the selection information is "0101" and "0102", the question A1 can be moved to the positions $L_{a2}$, $L_{a3}$ and $L_{a6}$, and the question A2 can be moved only to the position $L_{a0}$. Therefore, the position determination unit 23 determines that the position to which the selected item can be moved that is common to the questions A1 and A2 does not exist.

In the case where the item ID contained in the selection information is "0101" and "0107", the question A1 can be moved to the positions $L_{a2}$, $L_{a3}$ and $L_{a6}$, and the question A7 can be moved to the positions $L_{a2}$, $L_{a3}$ and $L_{a8}$. Therefore, the position determination unit 23 determines that the position to which the selected item can be moved that is common to the questions A1 and A7 is the positions $L_{a2}$ and $L_{a3}$. Note that, however, there are the constraints on the questions A1 and A7, "Question A7 should be after Question A1 and Question A2". Therefore, the position determination unit 23 determines that the question A7 is placed after the question A1 in the positions $L_{a2}$ and $L_{a3}$ to which the selected item can be moved. Specifically, when the position determination unit 23 determines that the positions of a plurality of selected items can be moved to at least one common position, it further determines the order of the plurality of selected items in the common position based on the constraint information.

In the case where the item ID contained in the selection information is "0101" and "0104", the question A1 can be moved to the positions $L_{a2}$, $L_{a3}$ and $L_{a6}$, and the question A4 can be moved to the positions $L_{a5}$ and $L_{a6}$. Therefore, the position determination unit 23 determines that the position to which the selected item can be moved that is common to the questions A1 and A4 is the position $L_{a6}$. Note that, however, there are the constraints on the questions A1 and A4, "Questions A4, A5 and A6 are in one group. Therefore, the position determination unit 23 determines that the question A1 is placed after the question A4 in the position $L_{a6}$ to which the selected item can be moved so that the question A1 is not placed in a position between the questions A4 to A6.

As described above, when the position determination unit 23 determines that positions of a plurality of selected items can be changed to at least one common position, it further determines the order of the plurality of selected items in each of the at least one common position by referring to the constraint information. When the selection information contains three or more item IDs also, the position determination unit 23 determines a position to which the plurality of selected items can be moved and determines the order of the plurality of selected items in that position based on the constraint information, in the same way as when the selection information contains two item IDs.

The transmitting unit 24 is a functional element that transmits, to the terminal 10, the position information input from the position determination unit 23 in order to display the position to which the selected item can be moved and the position to which the selected item cannot be moved in a distinguishable manner on the terminal 10. The transmitting unit 24 is implemented as a result that the processor 101 executes the server program P2 and controls the main storage unit 102 and the communication control unit 104, for example. The position information is a response to the selection information transmitted from the terminal 10. As described above, the display control unit 13 of the terminal 10 draws a heavy line at the position to which the selected item can be moved based on the position information (see the heavy line 91 in FIG. 1).

The list update unit 25 is a functional element that fixes the rearrangement of items by a user operation. The list update unit 25 is implemented as a result that the processor 101 executes the server program P2 and controls the main storage unit 102 and the communication control unit 104, for example.

The list update unit 25 updates the list data in the list database 31 which corresponds to the list ID indicated by the change information received from the terminal 10. By this update, the order of several items in the list is changed, and the update date and time are overwritten with the current date and time. "Update of list data" is processing of overwriting a value of a processing target in the list database 31 with a new value, and the value is changed or unchanged before and after the update. For example, it is assumed that the initial value of the list data with the list ID "01" is those shown in FIG. 4, and the change information indicates that the order has changed to "question A2, question A1, question A3, question A4, question A5, question A6, question A8 and question A7 from the top". In this case, by the processing of the list update unit 25, the order of the item ID "0101" in the list database 31 is changed from 1 to 2, the order of the item ID "0102" is changed from 2 to 1, the order of the item ID "0107" is changed from 7 to 8, and the order of the item ID "0108" is changed from 8 to 7. The order of the other item IDs is not changed as a result. The update date and time are updated from "Nov. 15, 2014 11:30" to the date and time at the time of updating.

In the case where the terminal 10 transmits the change information to the server 20 each time one operation is completed, the list update unit 25 updates the list database 31 based on the change information without referring to the constraint database 32 (constraint information corresponding to the list ID), and generates a notification of completion indicating the fix of update and then transmits the notification to the terminal 10.

Figure 7:
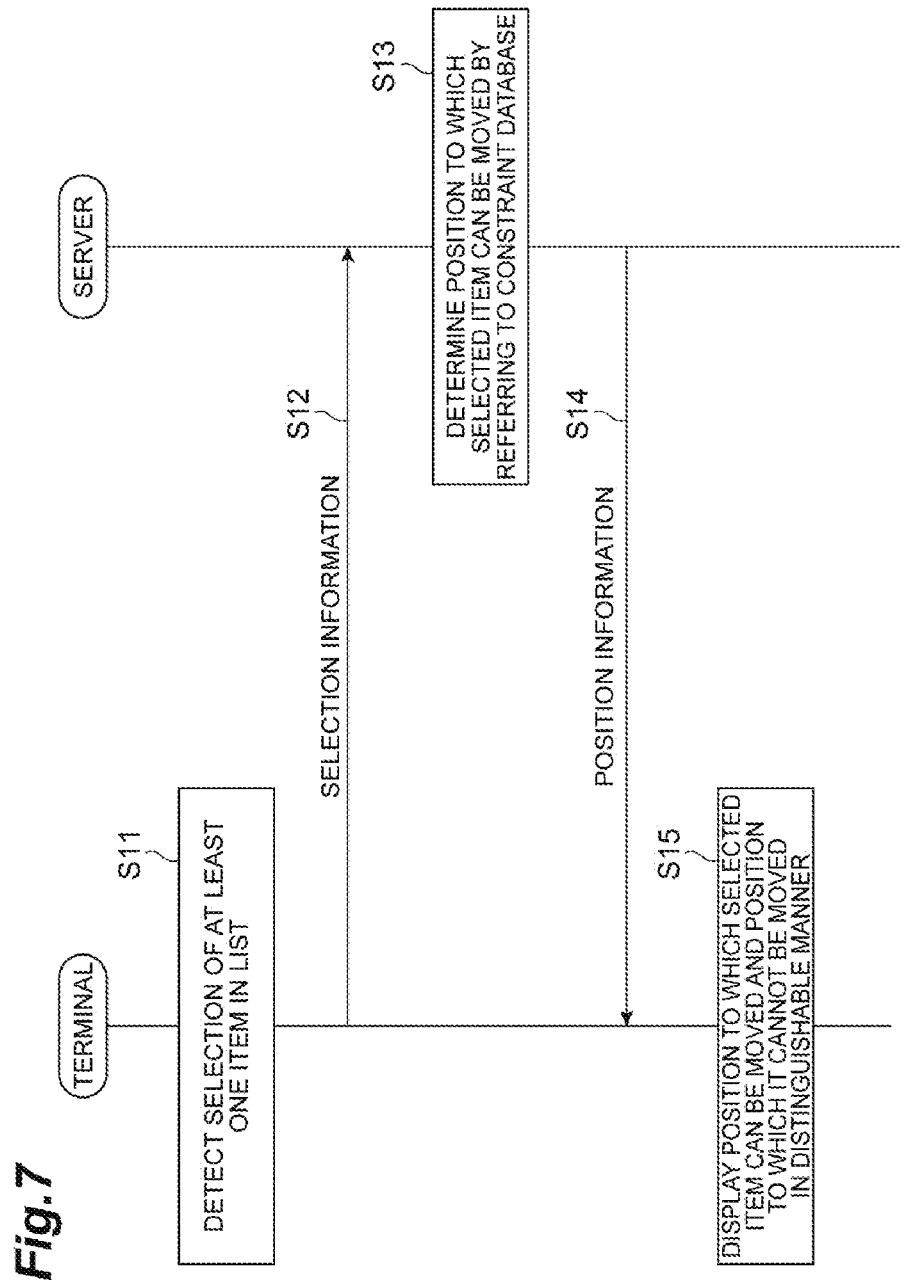
FIG. 7 is a flowchart showing an operation of the list management system according to the first embodiment.

Hereinafter, the operation of the list management system 1 and a display control method according to this embodiment are described with reference to FIG. 7. In this description, it is assumed that a list is already displayed on the terminal 10 by the collaboration of the list acquisition unit 11 and the list providing unit 21.

When a user selects at least one item to be moved on the terminal 10, the detection unit 12 detects the selection operation (Step S11), generates selection information containing the item ID of the selected item and the list ID and transmits the selection information to the server 20 (Step S12).

In the server 20, the receiving unit 22 receives the selection information (Step S12, receiving step). Then, the position determination unit 23 refers to the constraint database 32 based on the selection information (list ID and one or more item IDs) and determines the position to which the selected item can be moved, and generates position information indicating that position (Step S13, position determination step). When the selection information contains only one item ID, the position determination unit 23 generates the position information indicating the position to which the selected item can be moved that corresponds to that item ID. When the selection information contains a plurality of item IDs, the position determination unit 23 generates the position information indicating the position to which the selected item can be moved that is common to all of the item IDs. If there is no position to which the selected item can be moved, the position determination unit 23 sets null as the position information. After that, the transmitting unit 24 transmits the generated position information to the terminal 10 (Step S14, transmitting step).

In the terminal 10, the display control unit 13 receives the position information and displays the position to which the selected item can be moved and the position to which the selected item cannot be moved in a distinguishable manner based on the position information (Step S15). After that, when the user completes the movement of the selected item, the list data is updated by the processing of the list changing unit 14 and the list update unit 25.

Note that the processing of Steps S11 to S15 and the update of list data performed after that can be repeated.

Figure 8:
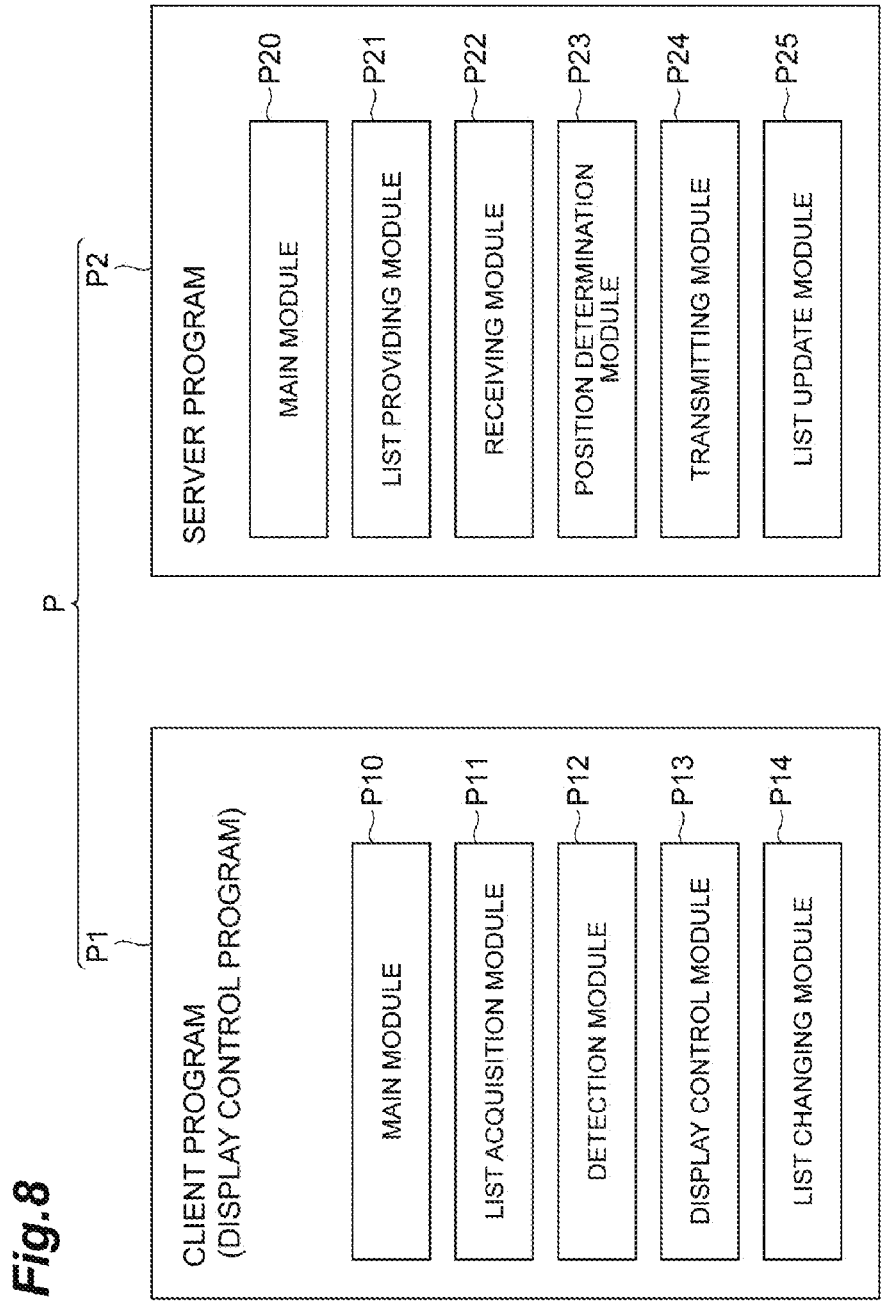
FIG. 8 is a view showing a configuration of a list management program according to the first embodiment.

A list management program P for implementing the list management system 1 is described hereinafter with reference to FIG. 8. The list management program P includes a client program (display control program) P1 that causes a computer 100 to function as the terminal 10 and a server program P2 that causes a computer 100 to function as the server 20. The language of the list management program P is not particularly limited. For example, the client program P1 may be created in JavaScript (registered trademark) and the server program P2 may be created in Java (registered trademark).

The client program P1 includes a main module P10, a list acquisition module P11, a detection module P12, a display control module P13, and a list changing module P14.

The main module P10 is a part that exercises control over the processing on the terminal side. The functions implemented by executing the list acquisition module P11, the detection module P12, the display control module P13 and the list changing module P14 are equal to the functions of the list acquisition unit 11, the detection unit 12, the display control unit 13 and the list changing unit 14 described above, respectively.

The server program P2 includes a main module P20, a list providing module P21, a receiving module P22, a position determination module P23, a transmitting module P24, and a list update module P25.

The main module P20 is a part that exercises control over the processing on the server side. The functions implemented by executing the list providing module P21, the receiving module P22, the position determination module P23, the transmitting module P24 and the list update module P25 are equal to the functions of the list providing unit 21, the receiving unit 22, the position determination unit 23, the transmitting unit 24 and the list update unit 25 described above, respectively.

Each of the client program P1 and the server program P2 is provided in the form of being recorded in a static manner on a tangible recording medium such as CD-ROM or DVD-ROM or semiconductor memory, for example. Further, each of the client program P1 and the server program P2 may be provided as a data signal superimposed onto a carrier wave through a communication network. The client program P1 and the server program P2 may be provided by different marketing channels. The client program P1 may be provided by being downloaded from the server to the terminal each time without being installed to the terminal or may be installed to the terminal. On the other hand, the server program P2 is generally installed to the server in advance.

The client program (display control program) may be provided with inclusion of only the detection module P12 and the display control module P13. In the case of causing a plurality of computers 100 to function as one server 20, the modules of the server program P2 may be distributed among those computers 100.

Second Embodiment

The functions and configuration of a list management system 1A according to the second embodiment are described hereinafter. The second embodiment is different from the first embodiment in that the list management system 1A is compatible with the case the same list is edited by a plurality of terminals. To be specific, in the case where the same list is displayed at the same time on a plurality of terminals, when the order of items in the list is changed on one terminal, the change is reflected on the other terminals. Hereinafter, matters peculiar to the second embodiment are particularly described in detail, and the same or similar matters as in the first embodiment are not redundantly described.

Figure 9:
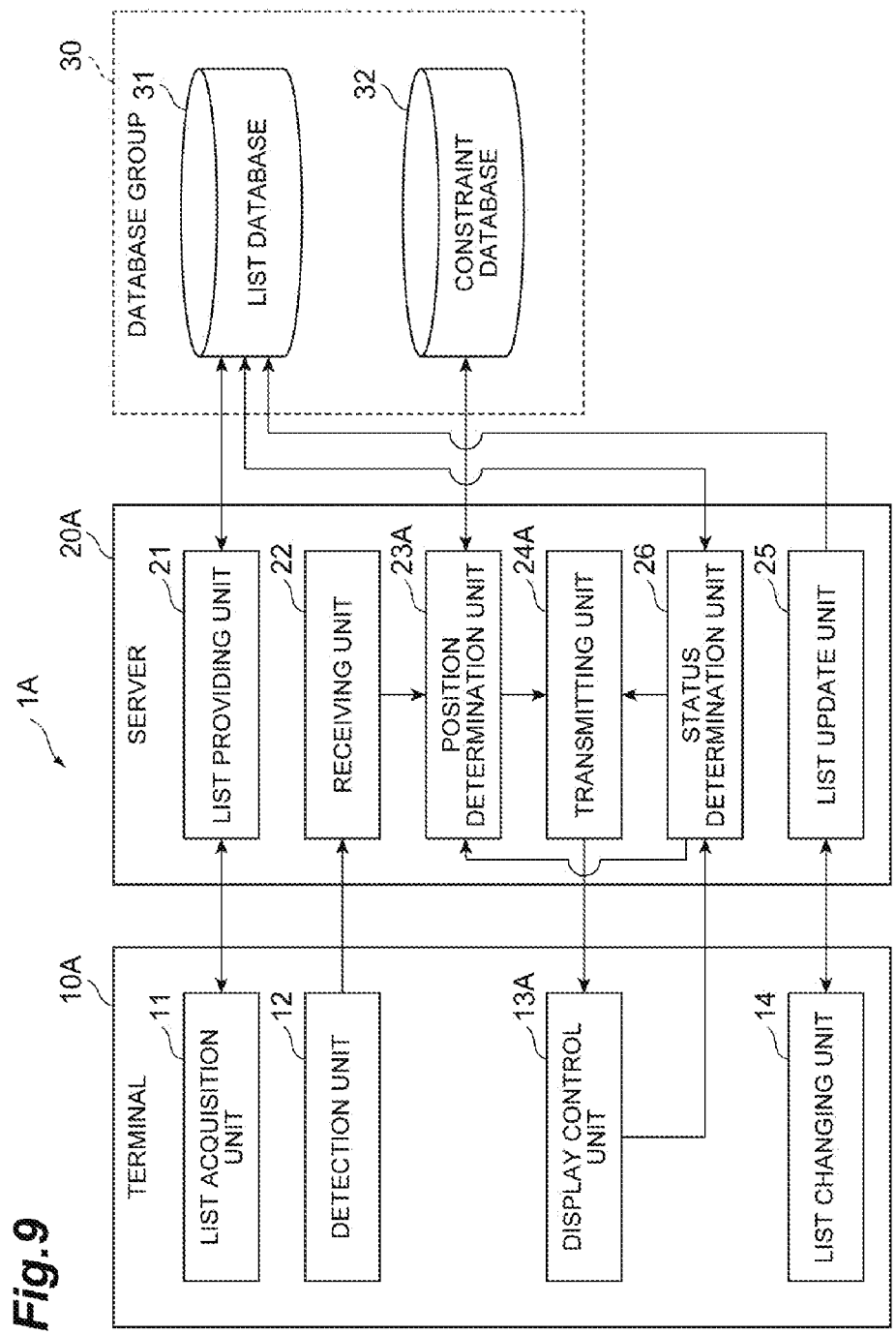
FIG. 9 is a block diagram showing a functional configuration of a list management system according to a second embodiment.

As shown in FIG. 9, the list management system 1A includes a terminal 10A, a server 20A, and a database group 30. While the database group 30 is the same as that of the first embodiment, the functional configurations of the terminal 10A and the server 20A are different from those of the first embodiment. Further, the list management system 1A includes a plurality of terminals 10A.

The terminal 10A includes, as functional elements, a list acquisition unit 11, a detection unit 12, a display control unit 13A and a list changing unit 14. Those functional elements are implemented as a result that the processor 101 of the terminal 10A executes an installed or downloaded client program P1A. Because the element having different functions from that in the first embodiment is the display control unit 13A, the display control unit 13A is described hereinbelow.

The display control unit 13A is a functional element that displays a position to which the selected item can be moved on the terminal 10A at an arbitrary time before the movement of the selected item is completed. In addition, the display control unit 13A makes an inquiry to the server 20A on a regular basis about whether the list currently displayed on the terminal 10A is updated by an instruction from another terminal 10A while it is displayed, and when the list is updated, replaces the list displayed on the terminal 10A with the updated one. The display control unit 13A is different from the display control unit 13 of the first embodiment in this additional function. The display control unit 13A is implemented as a result that the processor 101 executes the client program HA and controls the main storage unit 102, the communication control unit 104 and the output device 106, for example.

The display control unit 13A displays the position to which the selected item can be moved and the position to which the selected item cannot be moved in a distinguishable manner by the same process as in the display control unit 13. Then, the display control unit 13A makes an inquiry to the server 20A about whether the list is updated by another terminal 10A (another user) at regular intervals (for example, at intervals of 1 second). The inquiries are made until the selected item is moved to the position to which it can be moved and the order of items is changed, or until the selected item is deselected by a user operation without being moved to the position to which it can be moved. For example, the display control unit 13A makes that inquiries during the period when a user performs drag and drop.

To be specific, the display control unit 13A generates an inquiry signal containing selection information (a set of item IDs of the selected items and a list ID) and update date and time of list data and transmits this signal to the server 20A. After that, the display control unit 13A receives a no change notification or a change notification transmitted from the server 20A in response to the inquiry signal.

The no change notification is data indicating that the list data currently displayed on the terminal 10A is not updated by another terminal 10A. The fact that the no change notification is received means that the list data currently displayed on the terminal 10A is the same as the list data currently stored in the list database 31, and the list data is matching in the list management system 1A.

The change notification is data indicating that the list data currently displayed on the terminal 10A is updated in advance by another terminal 10A. The change notification contains the latest list data corresponding to the list ID transmitted by the inquiry signal and the latest position information corresponding to the list data. The fact that the change notification is received means that the list data currently displayed on the terminal 10A is different from the list data currently stored in the list database 31, and the list data mismatch is occurring in the list management system 1A.

When the no change notification is received, the display control unit 13A does not perform another processing until transmitting the next inquiry signal to the server 20A. Thus, the display of the position to which the selected item can be moved and the position to which the selected item cannot be moved remains unchanged.

On the other hand, when the change notification is received, the display control unit 13A replaces the currently displayed list data with the list data contained in the change notification. Further, the display control unit 13A displays the position to which the selected item can be moved (available position to be moved) and the position to which the selected item cannot be moved (unavailable position to be moved) in a distinguishable manner for the replaced list based on the latest position information. By this processing, the list (order of items) displayed on the terminal 10A is replaced with the latest one, and in some cases, the position to which the selected item can be moved and the position to which the selected item cannot be moved change. As a result of this processing, the user finds that the positions of items in the list and the position to which the selected item can be moved have changed while the user is about to change the order of items. Although the user can continue to select the currently selected item as it is, there is a case where the selected item cannot be moved to any position depending on the latest position information.

The server 20A includes, as functional elements, a list providing unit 21, a receiving unit 22, a position determination unit 23A, a transmitting unit 24A, a list update unit 25, and a status determination unit 26. Those functional elements are implemented as a result that the processor 101 of the server 20A executes a pre-installed server program P2A. Because the elements having different functions from those in the first embodiment are the position determination unit 23A, the transmitting unit 24A and the status determination unit 26, those functional elements are described hereinbelow.

The status determination unit 26 is described first. The status determination unit 26 is a functional element that, in response to an inquiry from the terminal 10A displaying a list, determines whether the list is updated by another terminal 10A while it is displayed. The status determination unit 26 is implemented as a result that the processor 101 executes the server program P2A and controls the main storage unit 102 and the communication control unit 104, for example.

The status determination unit 26 receives an inquiry signal from the terminal 10A and acquires a list ID and update date and time from the signal, and then reads list data corresponding to the list ID from the list database 31. Then, the status determination unit 26 compares the update date and time read from the list database 31 with the update date and time read from the inquiry signal.

When the update date and time are the same, the list data is not updated by another terminal 10A during the period when the list data is displayed on the terminal 10A that has transmitted the inquiry signal. Thus, the list data is matching between the terminal 10A that has transmitted the inquiry signal and the list database 31. In this case, the status determination unit 26 determines that the list is not updated while it is displayed on the terminal 10A, and generates the above-described no change notification and outputs the notification to the transmitting unit 24A.

On the other hand, when the update date and time are different (to be specific, when the update date and time read from the list database 31 is later than the update date and time read from the inquiry signal), the list data is updated by another terminal 10A during the period when the list data is displayed on the terminal 10A that has transmitted the inquiry signal. Thus, the list data is mismatching between the terminal 10A that has transmitted the inquiry signal and the list database 31. In this case, the status determination unit 26 determines that the list is updated by another terminal 10A while it is displayed on the terminal 10A. Then, the status determination unit 26 outputs the selection information contained in the inquiry signal and the latest list data read from the list database 31 to the position determination unit 23A.

The position determination unit 23A performs the same processing as the position determination unit 23 in the first embodiment. In addition, the position determination unit 23A performs the following processing when the selection information and the latest list data are input from the status determination unit 26. Specifically, the position determination unit 23A performs the same processing as the position determination unit 23 in this case also and thereby obtains the latest position information corresponding to the latest list data. The latest position information is information indicating the position in the latest list to which the currently selected item can be moved on the terminal 10A that has transmitted the inquiry signal. The position determination unit 23A generates a change notification containing the latest list data and the latest position information and outputs the notification to the transmitting unit 24A.

The transmitting unit 24A performs the same processing as the transmitting unit 24 in the first embodiment. In addition, the transmitting unit 24A transmits the no change notification or the change notification to the terminal 10A as a response to the inquiry signal.

Hereinafter, the operation of the list management system 1A and a display control method according to this embodiment are described with reference to FIGS. 10 and 11. In this description, it is assumed that the same list is already displayed on two terminals 10A, and the two terminals 10A are distinguished by the names "terminal X" and "terminal Y". Further, users of the terminals X and Y are "user Ux" and "user Uy", respectively. The following description focuses attention on what processing is done on the terminal Y in the case where the user Ux changes the order of items in the list in advance while the user Uy is about to change the order of items in the list.

Steps S21 to S25 are the process related to the terminal X, which are the same as Steps S11 to S15 in the first embodiment. When the user Ux selects at least one item to be moved on the terminal X, the detection unit 12 detects the selection operation (Step S21), generates selection information containing the item ID of the selected item and the list ID and transmits the selection information to the server 20A (Step S22). In the server 20A, the receiving unit 22 receives the selection information (Step S22, receiving step). Then, the position determination unit 23A refers to the constraint database 32 based on the selection information and determines the position to which the selected item can be moved, and generates position information indicating that position (Step S23, position determination step). After that, the transmitting unit 24A transmits the generated position information to the terminal X (Step S24, transmitting step). In the terminal X, the display control unit 13A receives the position information and displays the position to which the selected item can be moved and the position to which the selected item cannot be moved in a distinguishable manner based on the position information (Step S25).

Steps S26 to S30 are the process related to the terminal Y, which are also the same as Steps S11 to S15 in the first embodiment. When the user Uy selects at least one item to be moved on the terminal Y the detection unit 12 detects the selection operation (Step S26), generates selection information containing the item ID of the selected item and the list ID and transmits the selection information to the server 20A (Step S27). In the server 20A, the receiving unit 22 receives the selection information (Step S27, receiving step). Then, the position determination unit 23A refers to the constraint database 32 based on the selection information and determines the position to which the selected item can be moved, and generates position information indicating that position (Step S28, position determination step). After that, the transmitting unit 24A transmits the generated position information to the terminal Y (Step S29, transmitting step). In the terminal Y, the display control unit 13A receives the position information and displays the position to which the selected item can be moved and the position to which the selected item cannot be moved in a distinguishable manner based on the position information (Step S30).

Figure 10:
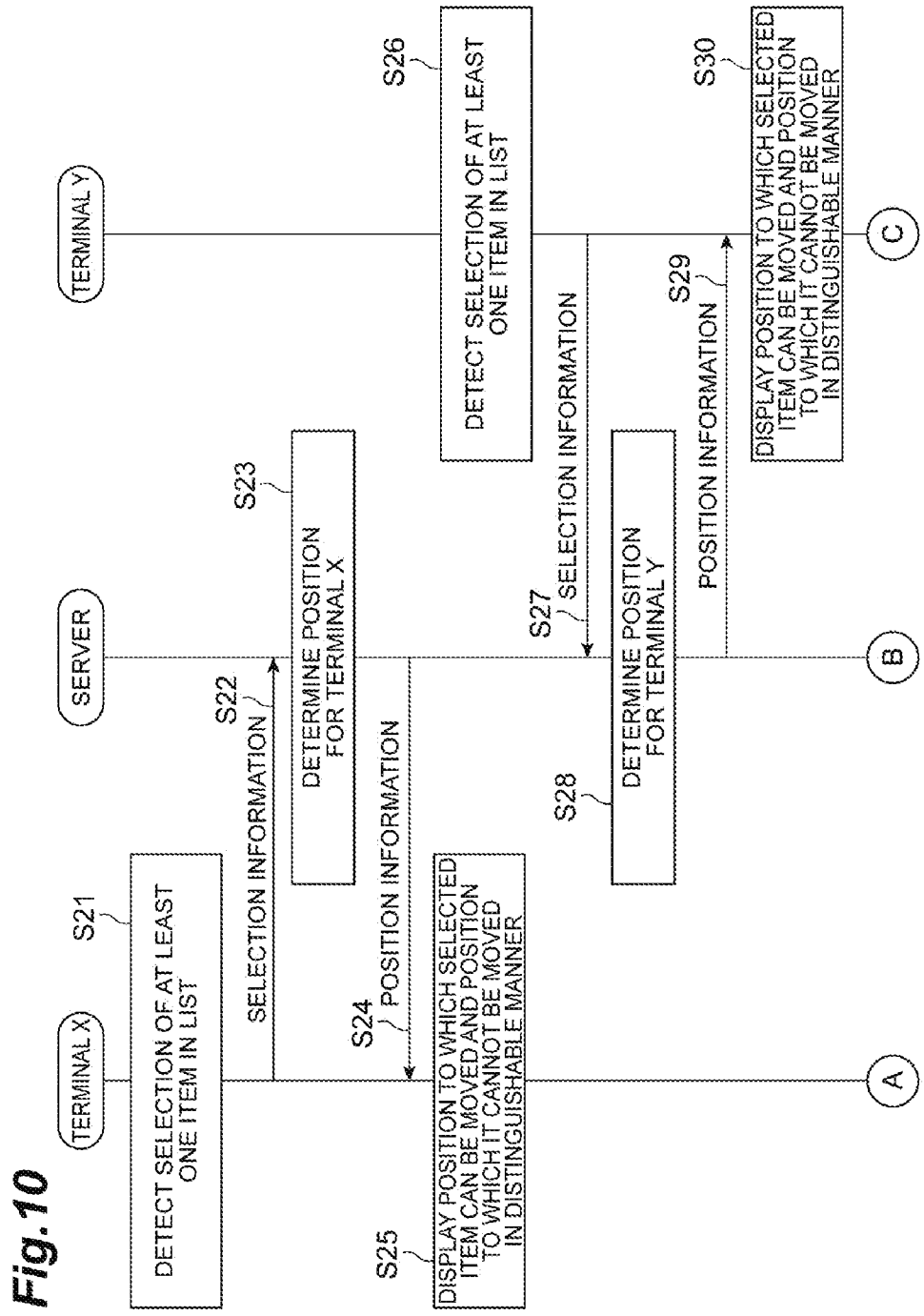
FIG. 10 is a flowchart showing an operation of the list management system according to the second embodiment.

Note that, although the process related to the terminal X comes before the process related to the terminal Y in FIG. 10, the order of performing Steps S21 to S30 along the time axis is not particularly limited.

After that, in the terminal Y, the display control unit 13A generates an inquiry signal and transmits the signal to the server 20A (Step S31). In the server 20A, the status determination unit 26 refers to the list database 31 in response to the inquiry signal and thereby checks the update status of the list data (Step S32). At this point of time, the list data is not updated by the operation of the user Ux, and therefore the update date and time of the list data in the list database 31 is the same as the update date and time contained in the inquiry signal. Therefore, the status determination unit 26 generates a no change notification and transmits the notification to the terminal Y (Step S33).

After that, when the user Ux completes one operation that changes the order of items on the terminal X (Step S34), the list changing unit 14 generates change information and transmits the information to the server 20A (Step S35). In the server 20A, the list update unit 25 updates the corresponding list data in the list database 31 based on the change information (Step S36). As a result, the mismatch of the list data occurs temporarily between the list database 31 and the terminal Y.

After that, in the terminal Y that has received the no change notification, the display control unit 13A transmits the inquiry signal to the server 20A again after the lapse of a specified time (Step S37). In the server 20A, the status determination unit 26 refers to the list database 31 in response to the inquiry signal and thereby checks the update status of the list data (Step S38). At this point of time, the list data is updated by the operation of the user Ux, and therefore the update date and time of the list data in the list database 31 is later than the update date and time contained in the inquiry signal. Therefore, the status determination unit 26 determines that the list is updated by another terminal (terminal X) while it is displayed on the terminal Y. In this case, the position determination unit 23A determines the position to which the selected item can be moved again and generates a change notification (Step S39, position determination step), and the transmitting unit 24A transmits the notification to the terminal Y (Step S40, transmitting step).

In the terminal Y, the display control unit 13A changes the currently displayed list to the latest state and displays the position to which the selected item can be moved again in response to the change notification (Step S41). By this processing, the matching of the list data is achieved again between the list database 31 and the terminal Y.

After that, when the user Uy completes one operation that changes the order of items on the terminal Y (Step S42), the list changing unit 14 generates change information and transmits the information to the server 20A (Step S43). In the server 20A, the list update unit 25 updates the corresponding list data in the list database 31 based on the change information (Step S44). As a result, both operations by the users Ux and Uy are reflected on the list database 31.

Figure 11:
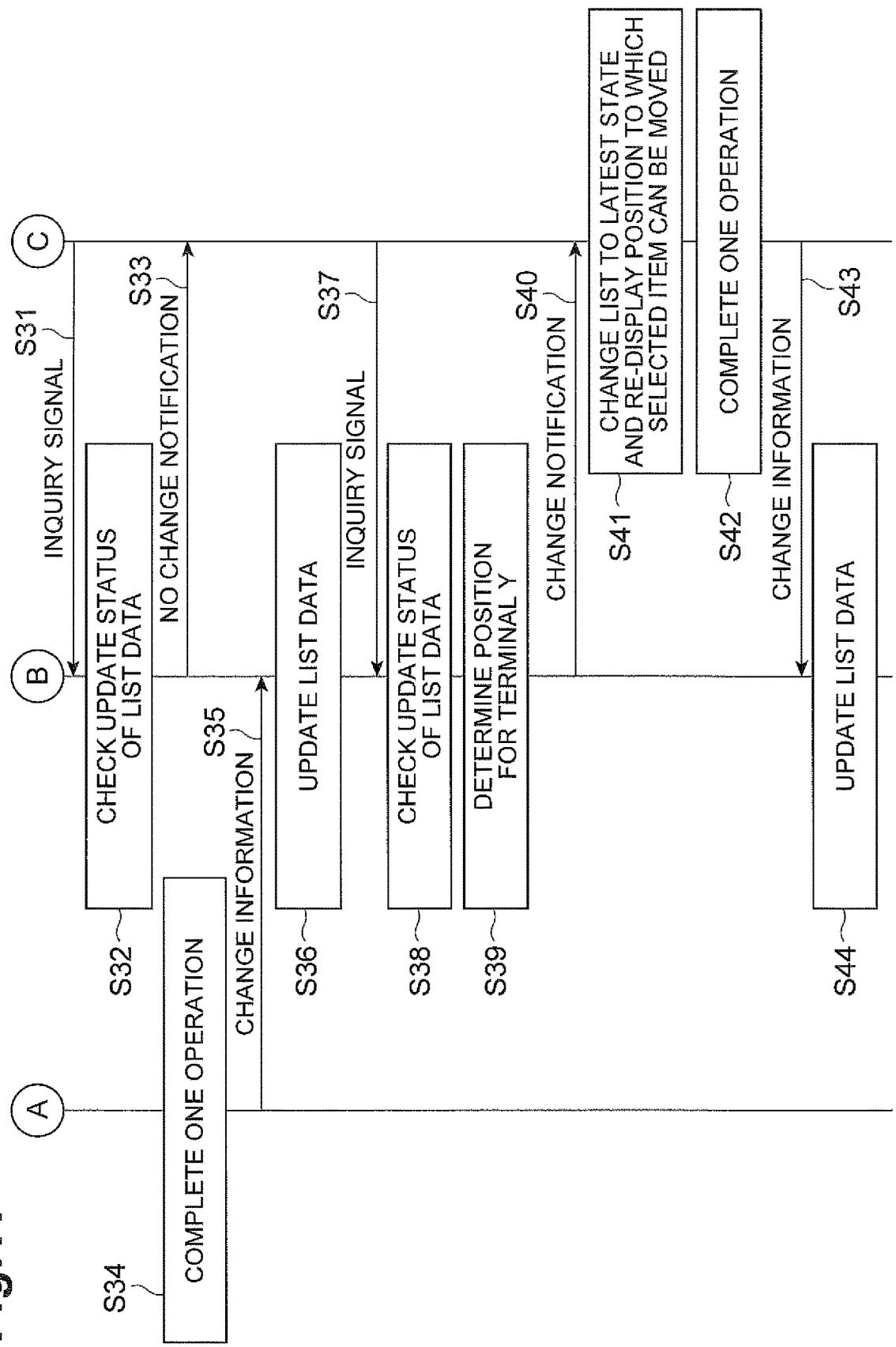
FIG. 11 is a flowchart showing an operation of the list management system according to the second embodiment.

Note that, although the terminal X can transmit an inquiry signal during a period until the user Ux completes one operation, the description of the transmission is omitted in FIGS. 10 and 11.

Figure 12:
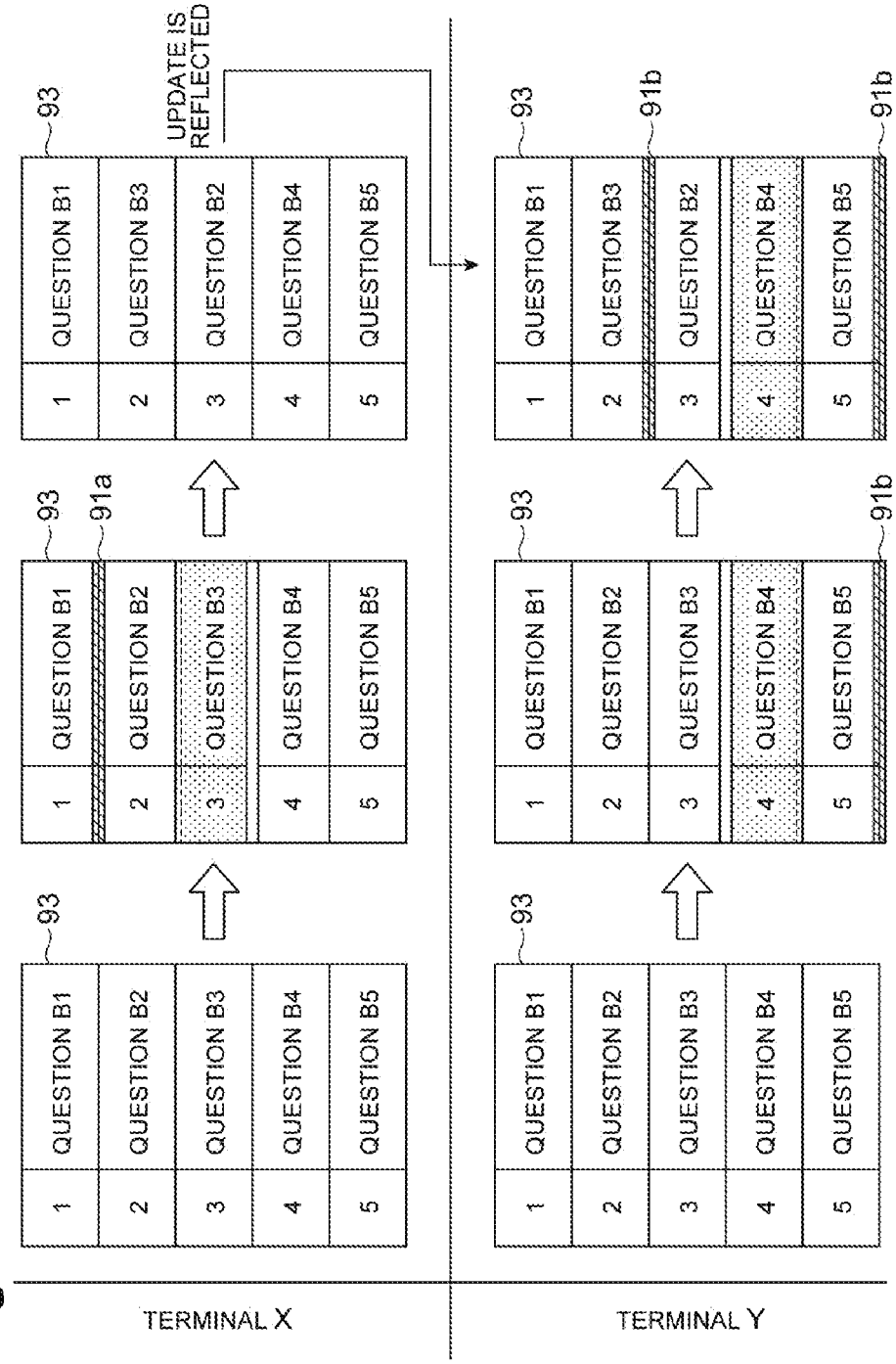
FIG. 12 is a view showing an example of display control according to the second embodiment.

An example of a change in a list that is displayed on the terminals X and Y during the above-described process is shown in FIG. 12. It is assumed that a list 93 corresponding to the list ID "02" shown in FIGS. 4 and 5 is displayed on both of the terminals X and Y. It is further assumed that the user Ux selects the question B3 on the terminal X as the item to be moved, and the user Uy selects the question B4 on the terminal Y as the item to be moved. For the list ID "02", the constraints that "Question B3 should be after Question B1" and "Question B4 should be after Question B3" are placed. Based on the constraints, a heavy line 91a is displayed at the position to which the question B3 can be moved on the terminal X, and a heavy line 91b is displayed at the position to which the question B4 can be moved on the terminal Y.

If the user Ux moves the question B3 to the position between the question B1 and the question B2 before the user Uy fixes the change of the order of the question B4, the list data corresponding to the list ID "02" in the list database 31 is updated. After that, the terminal Y transmits an inquiry signal to the server 20A, receives a change notification and processes the change notification, and thereby the change made on the terminal X is reflected on the terminal Y. In the example of FIG. 12, the number of positions to which the question B4 can be moved on the terminal Y increases to two.

Note that the above-described synchronization of the list data does not occur only when the operation of the order change is performed for the same list on a plurality of terminals 10A but also when the operation of the order change is performed only on one of a plurality of terminals 10A displaying the same list. For example, in the example of FIG. 12, even when the user Uy does not perform any operation for the list 93, as a result that the user Ux changes the order of the question B3, the list 93 where the change is reflected is displayed on the terminal Y.

Figure 13:
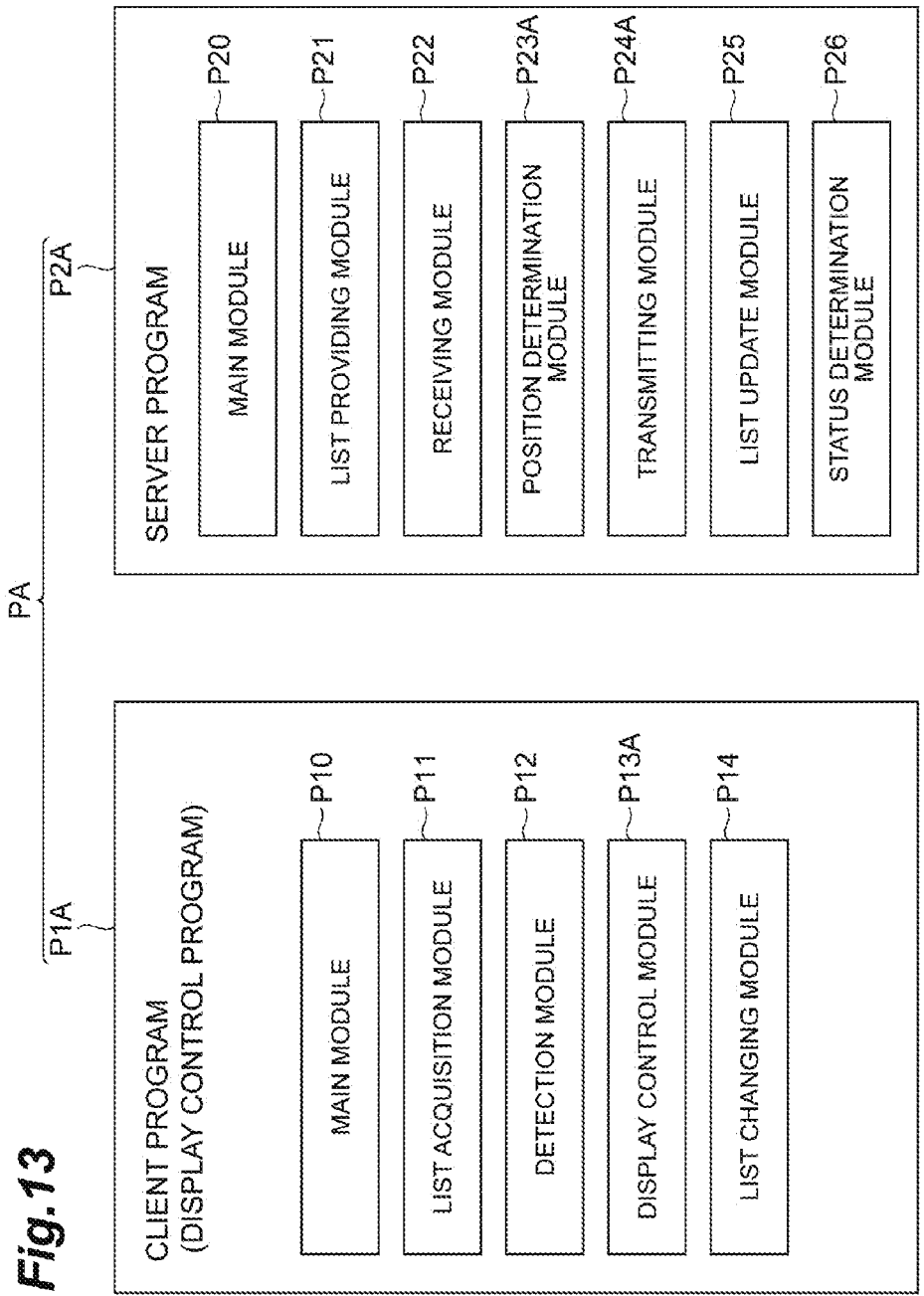
FIG. 13 is a view showing a configuration of a list management program according to the second embodiment.

A list management program PA for implementing the list management system 1A is described hereinafter with reference to FIG. 13. The list management program PA includes a client program (display control program) P1A that causes a computer 100 to function as the terminal 10A and a server program P2A that causes a computer 100 to function as the server 20A. The language of the list management program PA is not particularly limited as described in the first embodiment.

The client program P1A is different from the client program P1 in the first embodiment in that it includes a display control module P13A in place of the display control module P13. The functions implemented by executing the display control module P13A are equal to the functions of the display control unit 13A.

The server program P2A is different from the server program P2 in the first embodiment in that it includes a position determination module P23A and a transmitting module P24A in place of the position determination module P23 and the transmitting module P24, respectively. Further, the server program P2A includes a status determination module P26. The functions implemented by executing the position determination module P23A, the transmitting module P24A and the status determination module P26 are equal to the functions of the position determination unit 23A, the transmitting unit 24A and the status determination unit 26, respectively.

The client program (display control program) may be provided with inclusion of only the detection module P12 and the display control module P13A. In the case of causing a plurality of computers 100 to function as one server 20A, the modules of the server program P2A may be distributed among those computers 100.

In this embodiment, the description focuses attention on the case where the inquiry signal is transmitted while at least one item in a list is selected on the terminal 10A. However, the display control unit 13A may transmit the inquiry signal to the server 20A regardless of whether an item in a list is selected as the item to be moved. When an item in a list is not selected as the item to be moved, the display control unit 13A may transmit the inquiry signal containing the list ID and the update date and time of the list data. On the other hand, the status determination unit 26 determines whether the list is updated or not in response to the inquiry signal, and generates a no change notification when it is not updated, and generates a change notification containing the updated list data when it is changed. Then, the transmitting unit 24A transmits the no change notification or the change notification to the terminal 10A as a response to the inquiry signal.

As described above, a server according to one aspect of the present invention includes a receiving unit configured to receive, from the terminal, selection information indicating at least one item selected on a terminal displaying a list containing a set of a plurality of items; a position determination unit configured to determine a position to which the at least one item can be moved in the list by referring to a storage unit storing constraint information indicating constraints on an order of the plurality of items; and a transmitting unit configured to transmit, to the terminal, position information indicating a determination result by the position determination unit in order to display a position to which the at least one item can be moved and a position to which the at least one item cannot be moved in a distinguishable manner on the terminal at an arbitrary time before movement of the at least one item is completed.

A display control method according to one aspect of the present invention is a display control method performed by a server including a processor, the method including a receiving step of receiving, from the terminal, selection information indicating at least one item selected on a terminal displaying a list containing a set of a plurality of items; a position determination step of determining a position to which the at least one item can be moved in the list by referring to a storage unit storing constraint information indicating constraints on an order of the plurality of items; and a transmitting step of transmitting, to the terminal, position information indicating a determination result in the position determination step in order to display a position to which the at least one item can be moved and a position to which the at least one item cannot be moved in a distinguishable manner on the terminal at an arbitrary time before movement of the at least one item is completed.

A display control program according to one aspect of the present invention causes a computer to function as a detection unit configured to detect that at least one item is selected on a terminal displaying a list containing a set of a plurality of items and transmit selection information indicating the at least one item to a server; and a display control unit configured to receive position information transmitted from the server in response to the selection information and, based on the position information display a position to which the at least one item can be moved and a position to which the at least one item cannot be moved in the list in a distinguishable manner at an arbitrary time before movement of the at least one item is completed, and the server determines a position to which the at least one item can be moved in the list by referring to a storage unit storing constraint information indicating constraints on an order of the plurality of items, and the position information indicates a result of the determination.

According to the above aspects, when at least one item is selected in a list displayed on a terminal, a position to which the selected item can be moved is determined based on constraints on the order of items, and position information indicating the determination result is transmitted to the terminal. Then, based on the position information, a position to which the selected item can be moved and a position to which it cannot be moved are displayed in a distinguishable manner on the terminal. It is thus possible to show a user the constraints on the order (position to which the item can be moved) when the user intends to change the order of items in the list. Because the convenience of a user interface is improved in this way, a user, who is an operator, can reduce input operations and save time.

In a server according to another aspect, the constraint information may include group constraints indicating that at least two items should be arranged in series, and the position determination unit may determine that another item cannot be moved to a position between the at least two items based on the group constraints.

By preventing another item from being mixed in a group with use of such group constraints, it is possible to always treat a plurality of specific items as one group.

In a server according to another aspect, the selection information may indicate at least two items selected on the terminal, and the position determination unit may determine a position to which all of the at least two selected items can be moved.

By indicating a position to which all of items to be moved can be moved, a user can easily change the order of a plurality of items in one operation without being inconsistent with constraints.

A server according to another aspect may further include a status determination unit configured to determine, in response to an inquiry from the terminal displaying the list, whether the list is updated by another terminal during a period when the terminal displays the list, and, when it is determined that the list is updated by another terminal, the position determination unit may newly determine a position to which the at least one item can be moved in the updated list, and the transmitting unit may transmit, to the terminal, the updated list and new position information indicating a new determination result by the position determination unit.

In this case, when the order of items in the list is updated by another terminal while an operation on the list is performed by one terminal, the updated list is reflected on the one terminal. In addition, a position to which the selected item can be moved in the updated list is also provided to the one terminal. Thus, a user of the one terminal can find a new position to which an item in the list can be moved and move the item to that position without need to actively acquire the updated list.

An embodiment of the present invention is described in detail above. However, the present invention is not limited to the above-described embodiment. Various changes and modifications may be made to the present invention without departing from the scope of the invention.

As described above, the content of a list and an item is not particularly limited. Therefore, the present invention can be used for a purpose other than editing of questionnaires.

REFERENCE SIGNS LIST 1,1A . . . list management system, 10,10A . . . terminal, 11 . . . list acquisition unit, 12 . . . detection unit, 13, 13A . . . display control unit, 14 . . . list changing unit, 20,20A . . . server, 21 . . . list providing unit, 22 . . . receiving unit, 23,23A . . . position determination unit, 24,24A . . . transmitting unit, 25 . . . list update unit, 26 . . . status determination unit, 30 . . . database group, 31 . . . list database, 32 . . . constraint database, P,PA . . . list management program, P1,P1A . . . client program, P10 . . . main module, P11 . . . list acquisition module, P12 . . . detection module, P13,P13A . . . display control module, P14 . . . list changing module, P2,P2A . . . server program, P20 . . . main module, P21 . . . list providing module, P22 . . . receiving module, P23,P23A . . . position determination module, P24,P24A . . . transmitting module, P25 . . . list update module, P26 . . . status determination module

The invention claimed is:

1. A computer server comprising:
at least one memory configured to store computer program code; and
at least one processor configured to access said at least one memory and operate as instructed by said computer program code, said computer program code comprising:
receiving code configured to cause at least one of said at least one processor to receive, from a terminal, selection information indicating at least one item selected on said terminal displaying a list containing a set of a plurality of items;
position determination code configured to cause at least one of said at least one processor to determine a position to which the at least one item can be moved in the list by referring to a storage unit storing constraint information indicating constraints on an order of the plurality of items, the constraints including constraints on an order of items defined in accordance with a combination of the at least one selected item and an item contained in the list and not selected on the terminal; and
transmitting code configured to cause at least one of said at least one processor to transmit, to the terminal, position information indicating a determination result by the position determination code to display the position to which the at least one item can be moved in the list and a position to which the at least one item cannot be moved in the list in a distinguishable manner on the terminal at an arbitrary time before movement of the at least one item is completed, wherein
the constraint information includes group constraints indicating that at least two items should be arranged in series without allowing any another item to be interposed between the at least two items,
the position determination code is configured to cause at least one of said at least one processor to determine that the at least one item cannot be moved to a position between the at least two items based on the group constraints,
in response to determining that the list is updated by another terminal through a communication network, the position determination code causes at least one of said at least one processor to newly determine a position to which the at least one item can be moved in the updated list, and the transmitting code causes at least one of said at least one processor to transmit in real time, to the terminal, the updated list and new position information indicating a new determination result,
wherein, after the at least one item is selected to be moved and prior to moving the at least one selected item in the list, the transmitting code causes at least one of said at least one processor to transmit the position information such that the position to which the at least one item can be moved in the list is changed from an initial state to a first state, and the position to which the at least one item cannot be moved in the list is changed from an initial state to a second state, the first state and the second state being visually distinguishable from each other and concurrently displayed.

2. The computer server according to claim 1, wherein the selection information indicates two or more items selected on the terminal, and
the position determination code is configured to cause at least one of said at least one processor to determine a position to which all of the two or more selected items can be moved.

3. The computer server according to claim 2, wherein when the position determination code causes at least one of said at least one processor to determine that all of the two or more selected items can be moved to at least one common position, the position determination code causes at least one of said at least one processor to determine constraints on an order of the two or more items in each of the at least one common position by referring to the constraint information and then determine a position to which all of the two or more selected items can be moved.

4. The computer server according to claim 1, wherein the computer program code further comprises:
  status determination code configured to cause at least one of said at least one processor to determine, in response to an inquiry from the terminal displaying the list, whether the list is updated by the another terminal during a period when the terminal displays the list.

5. The computer server according to claim 1, wherein the first state and the second state are implemented by using letters and/or symbols.

6. The computer server according to claim 1, wherein the position to which the at least one item can be moved in the list in the first state and the position to which the at least one item cannot be moved in the list in the second state are displayed before receiving a command to complete the movement of the at least one item.

7. A display control method performed by a computer server including a processor, the method comprising:
  receiving, from a terminal, selection information indicating at least one item selected on the terminal displaying a list containing a set of a plurality of items;
  determining a position to which the at least one item can be moved in the list by referring to a storage unit storing constraint information indicating constraints on an order of the plurality of items, the constraints including constraints on an order of items defined in accordance with a combination of the at least one selected item and an item contained in the list and not selected on the terminal; and
  transmitting, to the terminal, position information indicating a determination result in order to display the position to which the at least one item can be moved in the list and a position to which the at least one item cannot be moved in the list in a distinguishable manner on the terminal at an arbitrary time before movement of the at least one item is completed, wherein
  the constraint information includes group constraints indicating that at least two items should be arranged in series without allowing any another item to be interposed between the at least two items,
  the determining the position comprises determining that the at least one item cannot be moved to a position between the at least two items based on the group constraints, and
  the method further comprises, in response to determining that the list is updated by another terminal through a communication network, newly determining a position to which the at least one item can be moved in the updated list, and transmitting in real time, to the terminal, the updated list and new position information indicating a new determination result,
  wherein the transmitting the position information comprises, after the at least one item is selected to be moved and prior to moving the at least one selected item in the list, transmitting the position information such that the position to which the at least one item can be moved in the list is changed from an initial state to a first state, and the position to which the at least one item cannot be moved in the list is changed from an initial state to a second state, the first state and the second state being visually distinguishable from each other and concurrently displayed.

8. A non-transitory computer-readable recording medium storing a display control program causing a computer to:
  detect that at least one item is selected on a terminal displaying a list containing a set of a plurality of items and transmit selection information indicating the at least one item to a server;
  receive position information transmitted from the server in response to the selection information, the position information indicating a position to which the at least one item can be moved in the list by referring to a storage unit storing constraint information indicating constraints on an order of the plurality of items, the constraints including constraints on an order of items defined in accordance with a combination of the at least one selected item and an item contained in the list and not selected on the terminal; and
  based on the position information, display the position to which the at least one item can be moved in the list and a position to which the at least one item cannot be moved in the list in a distinguishable manner at an arbitrary time before movement of the at least one item is completed, wherein
  the constraint information includes group constraints indicating that at least two items should be arranged in series without allowing any another item to be interposed between the at least two items,
  the determining the position comprises determining that the at least one item cannot be moved to a position between the at least two items based on the group constraints, and
  the method further comprises, in response to determining that the list is updated by another terminal through a communication network, newly determining a position to which the at least one item can be moved in the updated list, and transmitting in real time, to the terminal, the updated list and new position information indicating a new determination result,
  wherein the transmitting the position information comprises, after the at least one item is selected to be moved and prior to moving the at least one selected item in the list, transmitting the position information such that the position to which the at least one item can be moved in the list is changed from an initial state to a first state in the list, and the position to which the at least one item cannot be moved in the list is changed from an initial state to a second state in the list, the first state and the second state being visually distinguishable from each other and concurrently displayed.

* * * * *